United States Patent
Kang et al.

(10) Patent No.: US 12,165,079 B2
(45) Date of Patent: Dec. 10, 2024

(54) LEARNING DATA, SEMANTIC SPACE, AND GRAPH KNOWLEDGE MULTI-LAYERED KNOWLEDGE BASE SYSTEM AND PROCESSING METHOD THEREOF

(71) Applicant: ELECTRONICS AND TELECOMMUNICATIONS RESEARCH INSTITUTE, Daejeon (KR)

(72) Inventors: Dong-Oh Kang, Daejeon (KR); Chon Hee Lee, Nonsan-si (KR); Joon Young Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1027 days.

(21) Appl. No.: 17/127,287

(22) Filed: Dec. 18, 2020

(65) Prior Publication Data

US 2021/0192372 A1 Jun. 24, 2021

(30) Foreign Application Priority Data

Dec. 19, 2019 (KR) .................. 10-2019-0170867
Dec. 14, 2020 (KR) .................. 10-2020-0174621

(51) Int. Cl.
*G06N 5/04* (2023.01)
*G06F 16/22* (2019.01)
(Continued)

(52) U.S. Cl.
CPC .......... *G06N 5/04* (2013.01); *G06F 16/2282* (2019.01); *G06F 16/24573* (2019.01); *G06N 5/022* (2013.01); *G06N 7/01* (2023.01)

(58) Field of Classification Search
CPC .. G06N 5/04; G06N 7/01; G06N 3/04; G06N 5/022; G06F 16/2882; G06F 16/24573;
(Continued)

(56) References Cited

U.S. PATENT DOCUMENTS 10,169,355 B2 1/2019 Ramaswamy et al.
10,430,464 B1 10/2019 Ravi et al.
(Continued)

FOREIGN PATENT DOCUMENTS

EP           1560158 A1 *  8/2005  ............ G06N 20/00
KR     10-1145400        5/2012
(Continued)

OTHER PUBLICATIONS

Laffey et al., "Real-Time Knowledge-Based Systems", Mar. 15, 1988, AI Magazine, vol. 9 no. 1, pp. 27-45 (Year: 1988).*

(Continued)

*Primary Examiner* — Luis A Sitiriche
(74) *Attorney, Agent, or Firm* — KILE PARK REED & HOUTTEMAN PLLC

(57) ABSTRACT

A multi-layered knowledge base system and a processing method thereof are provided. In the system, semantic space learning of converting learning data into a semantic vector, which is a vector of semantic space, by learning a transformation function based on a plurality of learning data is performed. Then, relational knowledge learning of acquiring a relation between the semantic vectors by learning a relation function based on the semantic vectors obtained by the semantic space learning is performed. The acquired relation is converted into graph knowledge. The graph knowledge uses the relation as an edge and the semantic vector corresponding to the relation as a node.

17 Claims, 21 Drawing Sheets

(51) Int. Cl.
*G06F 16/2457* (2019.01)
*G06N 5/022* (2023.01)
*G06N 7/01* (2023.01)

(58) Field of Classification Search
CPC . G06F 16/9024; G06F 16/367; G06F 16/2282
See application file for complete search history.

(56) References Cited

U.S. PATENT DOCUMENTS

| | | | |
|---|---|---|---|
| 10,467,290 B1 | 11/2019 | Wu et al. | |
| 2014/0201629 A1 | 7/2014 | Heck | |
| 2017/0372210 A1* | 12/2017 | Soon-Shiong | G06T 9/00 |
| 2018/0011927 A1 | 1/2018 | Lee et al. | |
| 2018/0039890 A1 | 2/2018 | Kim et al. | |
| 2018/0082197 A1 | 3/2018 | Aravamudan et al. | |
| 2019/0272274 A1 | 9/2019 | Kale et al. | |

FOREIGN PATENT DOCUMENTS

| | | |
|---|---|---|
| KR | 10-1686067 | 12/2016 |
| KR | 20180059335 | 6/2018 |
| KR | 20180092194 | 8/2018 |
| KR | 20180120570 | 11/2018 |
| KR | 10-1933878 | 12/2018 |

OTHER PUBLICATIONS

Carroll et al., "Jena: implementing the semantic web recommendations", May 2004, Proceedings of the 13th international World Wide Web conference on Alternate track papers & posters, pp. 74-83. (Year: 2004).*

Soma et al., "Parallel Inferencing for OWL Knowledge Bases", Sep. 16, 2008, 37th International Conference on Parallel Processing, pp. 75-82. (Year: 2008).*

Thakkar et al., "Efficient Heterogeneous Multi-relational Classification Using Multi-criteria Ranking Approach Based on characteristics of Multiple Relations", Nov. 2015, Journal of Computers, vol. 10 No. 6, pp. 418-426 (Year: 2015).*

Pezeshkpour et al., "Embedding Multimodal Relational Data for Knowledge Base Completion", 2018, Proceedings of the 2018 Conference on Empirical Methods in Natural Language Processing, pp. 3208-3218. (Year: 2018).*

Vaigh et al., "Using Knowledge Base Semantics Context-Aware Entity Linking", Sep. 23, 2019, Proceedings of the ACM Symposium on Document Engineering 2019, pp. 1-10. (Year: 2019).*

Zhang et al., "Multi-modal Knowledge-aware Event Memory Network for Social Media Rumor Detection", Oct. 15, 2019, MM '19: Proceedings of the 27th ACM International Conference on Multimedia, pp. 1942-1951 (Year: 2019).*

Zhu et al., "Knowledge Base Reasoning with Convolutional-Based Recurrent Neural Networks", Nov. 4, 2019, IEEE Transactions on Knowledge and Data Engineering, vol. 33 Issue 5, pp. 2015-2028 (Year: 2019).*

Shu Guo et al., "Semantically Smooth Knowledge Graph Embedding", Proceedings of the 53rd Annual Meeting of the Association for Computational Linguistics and the 7th International Joint Conference on Natural Language Processing, Jul. 26-31, 2015, pp. 84-94.

Tan Xiao et al., "SSP: Semantic Space Projection for Knowledge Graph Embedding with Text Descriptions", Association for the Advancement of Artificial Intelligence, 2017, pp. 3104-3110.

* cited by examiner

Case in which $S_q$ and $P_q$ are provided as inference queries

First inference $(S\text{-}P\text{-}O)_{r1}$

Relation function

Value of relation function for
$S_q\text{-}P_q\text{-}O$ inferred based on a relation function r1 is 0.9

Case in which $S_q$ and $P_q$ are provided as inference queries

Second inference

Value of relation function for $S_q$-$P_q$-O inferred based on a relation function m1 for $S'_q$ which has a similarity of 0.8 to $S_q$ in semantic space is 0.9

LEARNING DATA, SEMANTIC SPACE, AND GRAPH KNOWLEDGE MULTI-LAYERED KNOWLEDGE BASE SYSTEM AND PROCESSING METHOD THEREOF

CROSS-REFERENCE TO RELATED APPLICATION

This application claims priority to and the benefit of Korean Patent Application Nos. 10-2019-0170867 filed in the Korean Intellectual Property Office on Dec. 19, 2019 and 10-2020-0174621 filed in the Korean Intellectual Property Office on Dec. 14, 2020, the entire contents of which are incorporated herein by reference.

BACKGROUND OF THE INVENTION

(a) Field of the Invention

The present disclosure relates to a knowledge base, and more particularly, to a multi-layered knowledge base system and a processing method thereof.

(b) Description of the Related Art

A knowledge base is one of the constituent elements of an expert system, and is a database that stores expert knowledge accumulated through intellectual activities and experiences of experts in a specific field, and facts and rules necessary for problem solving. For this knowledge base, text-oriented knowledge is stored in the form of a knowledge graph or ontology, and the knowledge base is grown through a knowledge base completion technique or finding an answer to a query through inferring about it. However, this method is mainly suitable for data with clear knowledge, i.e., learning data having explicit knowledge expression, such as text-oriented corpus or language-oriented data in form of a graph. As multimodal learning data such as images/videos/sounds are converted to text by specific learning and then become a knowledge base, the data inherent in the multimodal learning data cannot be fully utilized, and only information extracted from learning limited to a specific task or domain can be used. In addition, there are disadvantages such as loss of information and knowledge due to the inability to utilize the inherent knowledge through exchange or convergence of knowledge between learning data.

In addition, from the viewpoint of continuously adding knowledge to the knowledge base for given learning data and growing it, if the knowledge added to the previous learning data and the new learning data is composed only in the form of a piece of text, when attempting to converge the knowledge between them, only information extracted from learning limited to a specific task or domain can be used. In addition, there are disadvantages in that it is not possible to extract more knowledge by mutually utilizing information and knowledge between learning data, and effective knowledge convergence is not achieved due to lack of interrelation.

The above information disclosed in this Background section is only for enhancement of understanding of the background of the disclosure, and therefore it may contain information that does not form the prior art that is already known in this country to a person of ordinary skill in the art.

SUMMARY OF THE INVENTION

The present disclosure has been made in an effort to provide a multi-level knowledge base system that stores multi-level knowledge information ranging from intrinsic knowledge to explicit knowledge, and a method of searching and extracting knowledge through the interaction and connection of each layer.

In addition, the present disclosure has been made in an effort to provide a method for inferring and growing knowledge at a high speed from a multi-layered knowledge base.

An embodiment of the present disclosure provides a processing method for a knowledge base system. The processing method includes: performing semantic space learning of converting learning data into a semantic vector, which is a vector of semantic space, by learning a transformation function based on a plurality of learning data; performing relational knowledge learning of acquiring a relation between the semantic vectors by learning a relation function based on the semantic vectors obtained by the semantic space learning; and converting the acquired relation into graph knowledge, wherein the graph knowledge uses the relation as an edge and the semantic vector corresponding to the relation as a node, wherein the knowledge base system includes a learning data layer that stores and manages the learning data, a semantic space layer that stores and manages semantic space knowledge that are semantic vectors acquired according to the semantic space learning, and a graph knowledge layer that stores and manages the graph knowledge acquired by the relational knowledge learning.

In an implementation, the processing method may further include: generating semantic space knowledge metadata that maps the learning data, the transformation function, and the acquired semantic vector in the semantic space learning; and generating graph knowledge metadata that maps the semantic vector, the relation functions, and related graph knowledge in the relational knowledge learning, wherein based on metadata related to the learning data, the semantic space knowledge metadata, and the graph knowledge metadata, search and association between the learning data layer, the semantic space layer, and the graph knowledge layer may be made.

In an implementation, the learning data may be multimodal data including at least one of an image and audio.

In an implementation, the processing method may further include: performing inference for each layer of the knowledge base system according to an inference request, wherein the performing of inference may include at least one of performing a first inference based on graph knowledge included in the graph knowledge layer; performing second inference based on semantic space knowledge included in the semantic space layer; and performing third inference based on learning data included in the learning data layer.

In an implementation, the processing method may further include assigning different confidence to the first inference, the second inference, and the third inference, and acquiring a final inference result based on a result of the first inference, a result of the second inference, and a result of the third inference according to the different confidence.

In an implementation, the performing of inference may include performing inference in parallel for each of a plurality of domains.

In an implementation, the performing of inference may perform at least one of the performing of first inference, the performing of second inference, and the performing of third inference according to a predetermined inference depth.

In an implementation, the performing of inference may perform at least one of the performing of first inference, the performing of second inference, and the performing of third inference according to a predetermined time.

In an implementation, the performing of inference may include generating new knowledge through multi-level knowledge inference based on input learning data or input fact information.

In an implementation, the generating of new knowledge may include: finding similar learning data in the learning data layer for input learning data and extracting a semantic vector corresponding to the similar learning data and a transformation function thereof in the semantic space layer; inferring a new relation by performing predictive inference based on the relation function for the extracted semantic vector; and generating graph knowledge for the inferred new relation and storing it in the graph knowledge layer.

In an implementation, the generating of new knowledge may include: verifying a previous prediction inference result based on input fact information; modifying a relation function corresponding to the previous prediction inference result based on the verification result; inferring a new relation by performing predictive inference based on the modified relation function; and generating graph knowledge for the inferred new relation and storing it in the graph knowledge layer.

Another embodiment of the present disclosure provides a multi-layered knowledge base system. The system includes: an interface device configured to receive data; a storage device configured to store knowledge information; and a processor configured to form a knowledge base based on the data, wherein the processor is configured to include: a semantic space learning unit configured to perform semantic space learning of converting learning data into a semantic vector, which is a vector of semantic space, by learning a transformation function based on a plurality of learning data input through the interface device; and a relational knowledge learning unit configured to perform relational knowledge learning of acquiring a relation between the semantic vectors by learning a relation function based on the semantic vectors obtained by the semantic space learning, wherein the relational knowledge learning unit is further configured to convert the acquired relation into graph knowledge, wherein the graph knowledge uses the relation as an edge and the semantic vector corresponding to the relation as a node.

In an implementation, the storage device may include: a learning data storage unit configured to store a learning data layer that stores and manages the learning data; a semantic space knowledge storage unit configured to store a semantic space layer that stores and manages semantic space knowledge that are semantic vectors acquired according to the semantic space learning; and a graph knowledge storage unit configured to store a graph knowledge layer that stores and manages the graph knowledge acquired by the relational knowledge learning.

In an implementation, the processor may further include a knowledge element management unit configured to generate learning data metadata related to the learning data, generate semantic space knowledge metadata that maps the learning data, the transformation function, and the acquired semantic vector in the semantic space learning, and generate graph knowledge metadata that maps the semantic vector, the relation functions, and related graph knowledge in the relational knowledge learning, wherein based on metadata related to the learning data, the semantic space knowledge metadata, and the graph knowledge metadata, search and association between the learning data layer, the semantic space layer, and the graph knowledge layer may be made.

In an implementation, the processor may further include an inference processing unit configured to perform inference for each layer of the knowledge base system according to an inference request, wherein the inference processing unit may be configured to perform at least one operation of: performing a first inference based on graph knowledge included in the graph knowledge layer; performing second inference based on semantic space knowledge included in the semantic space layer; and performing third inference based on learning data included in the learning data layer.

In an implementation, the inference processing unit may be configured to further perform an operation of assigning different confidence to the first inference, the second inference, and the third inference, and acquiring a final inference result based on a result of the first inference, a result of the second inference, and a result of the third inference according to the different confidence.

In an implementation, the inference processing unit may include a plurality of prediction inference units that perform inference for each of a plurality of domains, wherein the plurality of prediction inference units may perform inference in parallel for each of a plurality of domains.

In an implementation, the inference processing unit may be configured to perform at least one operation of the performing of first inference, the performing of second inference, and the performing of third inference according to a predetermined inference depth.

In an implementation, the inference processing unit may be configured to perform at least one operation of the performing of first inference, the performing of second inference, and the performing of third inference according to a predetermined time.

In an implementation, the inference processing unit may be configured to perform inferences about a plurality of relation functions according to the first inference and give weight results of the interferences to infer new knowledge, perform inferences about a plurality of relation functions according to the second inference and give weight results of the interferences to infer new knowledge, or perform inferences about a plurality of relation functions according to the third inference and give weight results of the interferences to infer new knowledge.

DETAILED DESCRIPTION OF THE EMBODIMENTS

Figure 1:
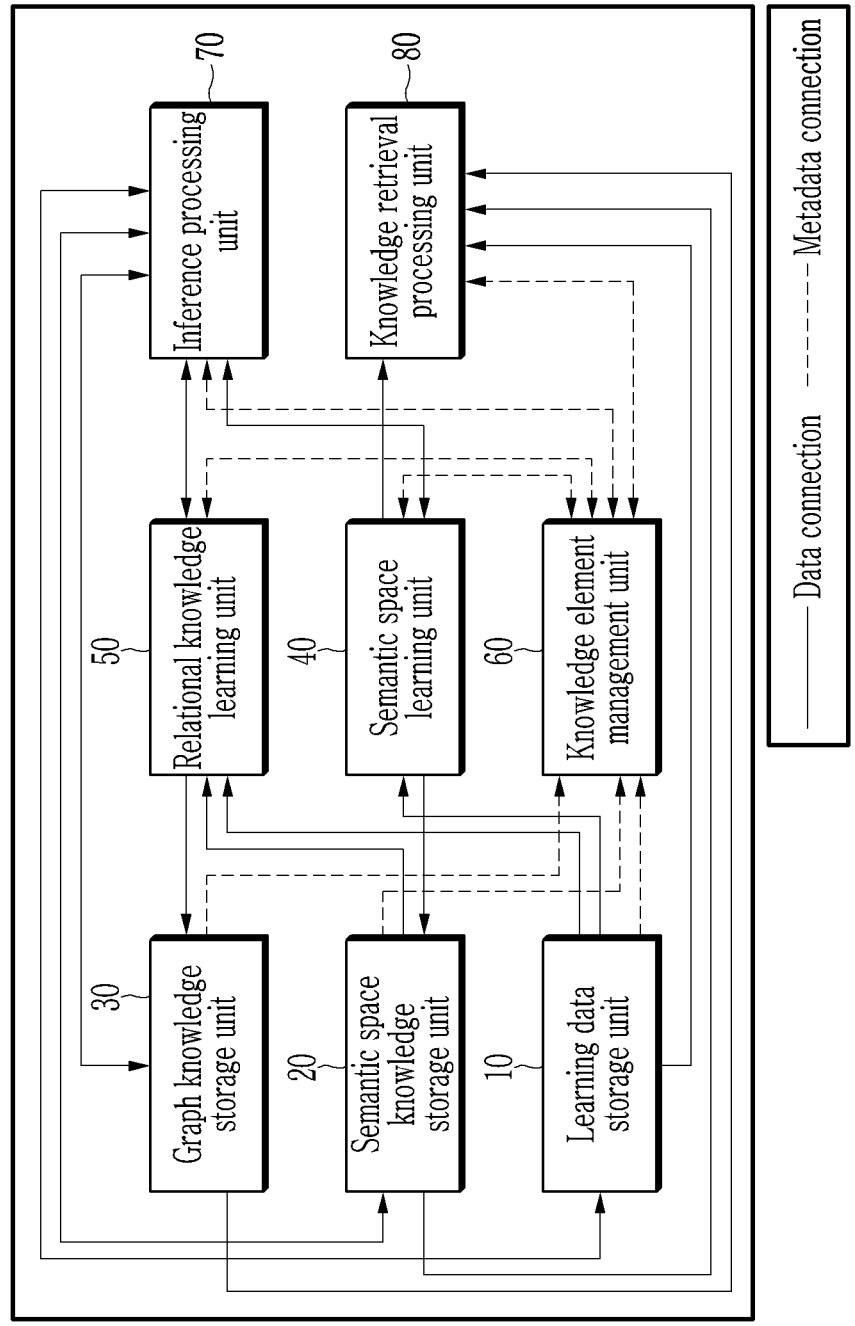
FIG. 1 is a diagram illustrating a structure of a multi-layered knowledge base system according to an embodiment of the present disclosure.

In the following detailed description, only certain embodiments of the present disclosure have been shown and described, simply by way of illustration. Hereinafter, embodiments of the present disclosure will be described in detail with reference to the accompanying drawings so that those of ordinary skill in the art may easily implement the present disclosure. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, in addition, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, a multi-layered knowledge base system and a processing method thereof according to an embodiment of the present disclosure will be described with reference to the drawings.

FIG. 1 is a diagram illustrating a structure of a multi-layered knowledge base system according to an embodiment of the present disclosure.

As shown in FIG. 1, the multi-layered knowledge base system 1 according to an embodiment of the present disclosure includes a learning data storage unit 10, a semantic space knowledge storage unit 20, a graph knowledge storage unit 30, a semantic space learning unit 40, a relational knowledge learning unit 50, a knowledge element management unit 60, an inference processing unit 70, and a knowledge retrieval processing unit 80.

The learning data storage unit 10 is configured to store a knowledge source element for growing knowledge. There are a plurality of learning data, and each learning data is configured based on domains and tasks. Learning data may be classified into structured data, semi-structured data, and unstructured data. The structured data represent data that expresses knowledge in a specific structure, such as a database (DB), structured digital abstracts (SDA), and a graph. The 10) unstructured data represents data that is randomly organized without a specific structure on the web or the like. The semi-structured data represents data having a structure such that knowledge suitable for a specific purpose is embedded based on a task or domain rather than a structure of expressing complete knowledge such as a DB or graph, and, for example, refers to machine learning data. This learning data is stored in the learning data storage unit 10, and is managed by the knowledge element management unit 60 as a knowledge source element based on the database schema.

The learning data is used for learning of semantic space and learning of graph knowledge, and the data used for knowledge learning includes both single modal data consisting of text only, such as a corpus, and multimodal data such as images/videos and corpus pairs. The learning data stored in the learning data storage unit 10 is provided to the semantic space learning unit 40, the relational knowledge learning unit 50, and the inferring processing unit 70 according to a call.

The semantic space learning unit 40 is configured to learn a transform function that takes learning data from the learning data storage unit 10 and converts it into a semantic space. Here, the transform function converts the learning data into a vector of semantic space (also referred to as a semantic vector) based on the knowledge inherent in the learning data, and may have various forms such as a neural network, fuzzy mapping, or a matrix function. When learning data is single modal data, graph embedding, word embedding, image embedding, etc. can be used, and when learning data is multimodal data, embedding is performed by connecting individual embedding or by multimodal word embedding.

The semantic space knowledge storage unit 20 is configured to store and manage semantic vectors of learning data learned by the semantic space learning unit 40. The semantic vector is indexed and managed by the learning data, and metadata corresponding thereto is managed by the knowledge element management unit 60.

The knowledge element management unit 60 is configured to manage metadata related to a semantic vector indexed by the learning data, that is, semantic space knowledge metadata.

Figure 2:
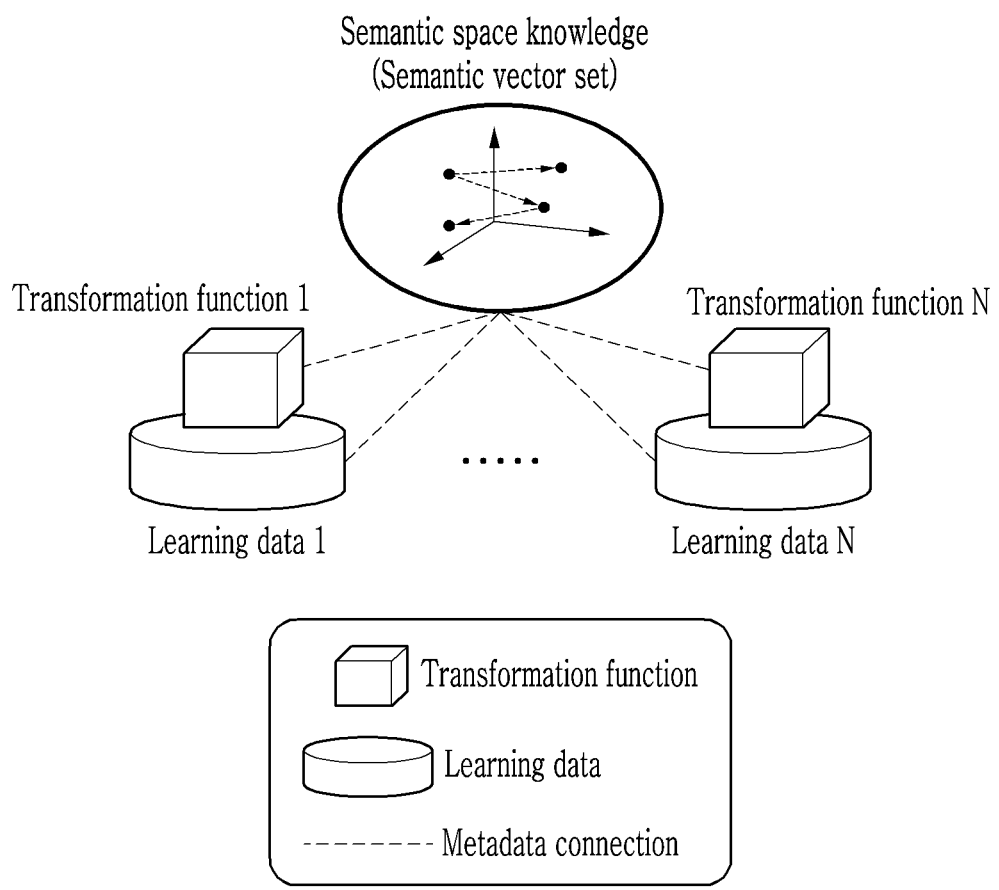
FIG. 2 is a schematic diagram illustrating semantic space knowledge metadata management according to an embodiment of the present disclosure.

FIG. 2 is a schematic diagram illustrating semantic space knowledge metadata management according to an embodiment of the present disclosure.

Semantic space learning is individually performed on a plurality of learning data including learning data 1 to learning data N, and corresponding semantic vectors are obtained. For example, as shown in FIG. 2, learning data 1 is converted into a semantic space through a transformation function 1 to obtain a corresponding semantic vector, and learning data 1 is converted into a semantic space through a transformation function N to obtain a corresponding semantic vector. Accordingly, a semantic vector set including semantic vectors for a plurality of learning data is obtained.

The semantic vector set can also be viewed as a semantic space knowledge set. In this way, the knowledge element management unit 60 represents and manages an extraction process of knowledge as metadata, that is, semantic space knowledge metadata. The extraction process of knowledge links the learning data used for semantic space learning, a semantic vector that is a vectorialized result extracted by learning, a transformation function that is a knowledge model that is a result of learning, and a semantic space knowledge that is corresponding knowledge results.

Meanwhile, the relational knowledge learning unit 50 is configured to learn a relation between semantic vectors stored in the semantic space knowledge storage unit 20. The relational knowledge learning unit 50 calls learning data associated with a semantic vector and uses it to learn relations. For example, a relation that takes two semantic vectors as inputs is expressed as a matrix or a neural network, learning data associated with the semantic vector is used to learn them, and a label corresponding to the relation between the semantic vectors is output. The relation function expressed by such a matrix or neural network outputs an intensity corresponding to the relation for each type of relation between two semantic vectors, and the relation is regarded as a valid relation if the intensity is greater than a preset threshold.

Relational knowledge about the relation between the semantic vectors generated by the relational knowledge learning unit 50 is converted into graph knowledge and stored in the graph knowledge storage unit 30. Graph knowledge consists of a graph with a semantic vector as a node and a relation as an edge.

The knowledge element management unit 60 is configured to manage metadata related to a connection relation between data used for learning the relation between the semantic vectors, that is, graph knowledge metadata.

Figure 3:
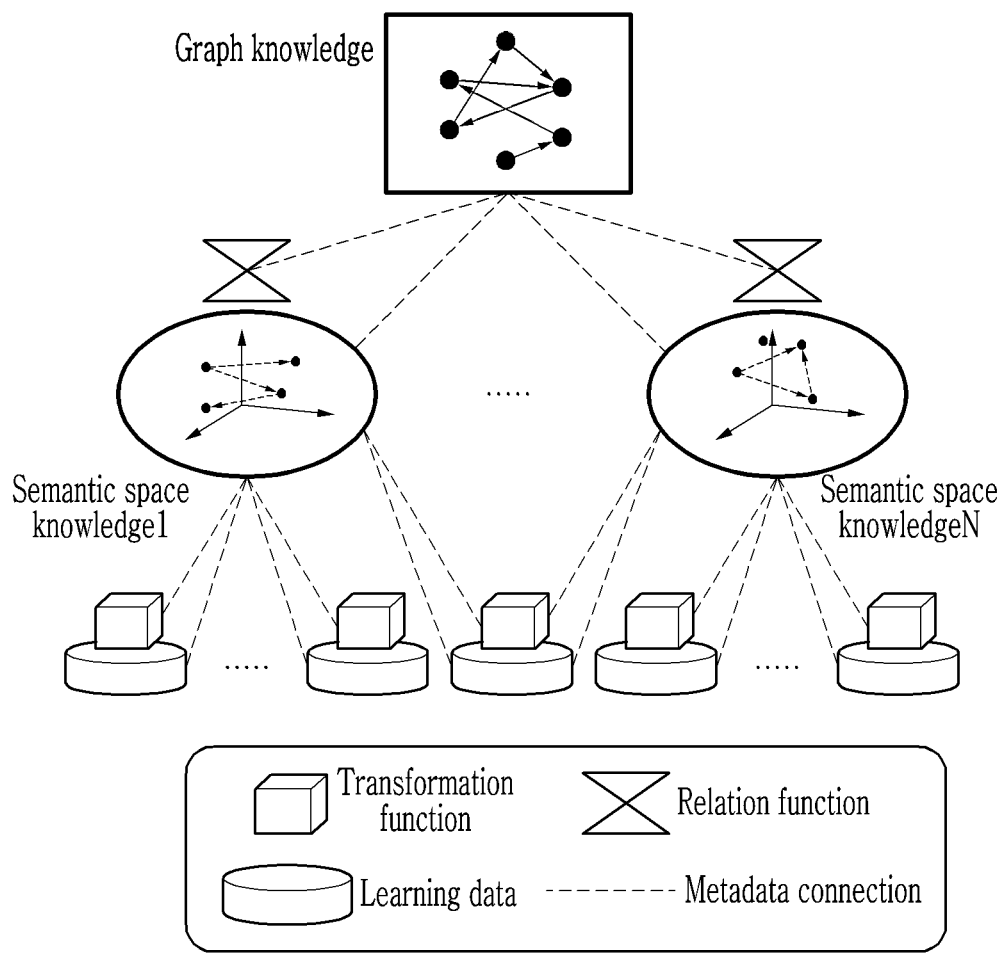
FIG. 3 is a schematic diagram illustrating graph knowledge metadata management according to an embodiment of the present disclosure.

FIG. 3 is a schematic diagram illustrating graph knowledge metadata management according to an embodiment of the present disclosure.

For a plurality of semantic space knowledges including semantic vectors, that is, semantic space knowledge 1 to semantic space knowledge N, learning is performed on the relation between semantic space knowledge and corresponding graph knowledge is obtained. For example, as shown in FIG. 3, for a plurality of semantic space knowledges, a process of obtaining graph knowledge representing the relation through a relation function by inputting two semantic space knowledges is performed, and a plurality of graph knowledges are obtained. The knowledge element management unit 60 represents and manages an extraction process of knowledge as metadata, that is, graph knowledge metadata. The extraction process of knowledge links learning data and semantic vectors (semantic space knowledge) used for learning relational knowledge, a relation function that is a knowledge model that is a result of learning, and graph knowledge that is corresponding knowledge results.

In this way, knowledge acquired according to learning performed by the semantic space learning unit 40 and the relational knowledge learning unit 50 based on the learning data may be managed in multiple layers.

Figure 4:
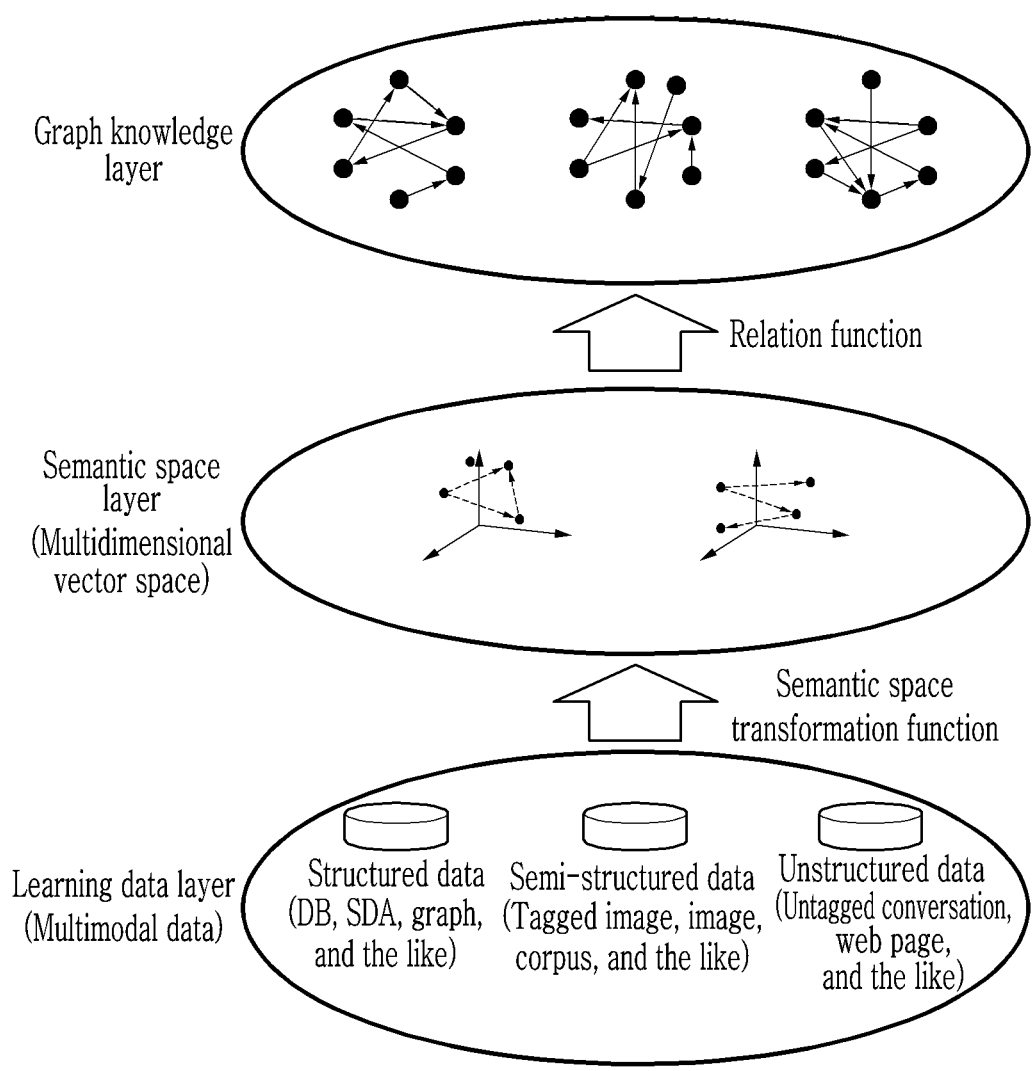
FIG. 4 is a diagram illustrating the concept of multi-layered knowledge management according to an embodiment of the present disclosure.

FIG. 4 is a diagram illustrating the concept of multi-layered knowledge management according to an embodiment of the present disclosure.

Multiple layers including a learning data layer that includes learning data (including multi-modal data), which is the basis of learning, a semantic space layer (multi-dimensional vector space) that includes a semantic space vector (semantic vector) obtained by learning a transform function with learning data, and a graph knowledge layer that includes graph knowledge, which represents a relation between semantic spaces formed by learning a semantic space transformation function with a semantic space vector, are formed. Knowledge management may be performed based on the multiple layers.

Meanwhile, the inference processing unit 70 is configured to infer a relation through predictive inference for a relation that does not exist in the graph knowledge storage unit 30. Here, the latent feature model method that deals with relation functions that take an intrinsic feature as input, such as RESCAL, TransE, or the graph feature model that utilizes the characteristics of the graph itself such as a path ranking algorithm (PRA) can be used to predict and infer knowledge other than the graph knowledge generated by the learning data. In the case of an intrinsic characteristic model, the semantic vector used in the semantic space can be used as an implicit characteristic similar to acquiring semantic space knowledge.

In addition, the inference processing unit 70 may utilize the relation function used in the relational knowledge learning unit 50 as it is for predictive inference. In this case, knowledge may be grown by using newly generated triple knowledge, semantic vectors related thereto, or other graph knowledge or relation functions connected to the learning data. The newly generated graph knowledge is stored in the graph knowledge storage unit 30.

The inference processing unit 70 may generate new knowledge by performing a multi-level knowledge search using information related to semantic space knowledge, relation function, transformation function, and learning data connected to graph knowledge metadata.

Figure 5:
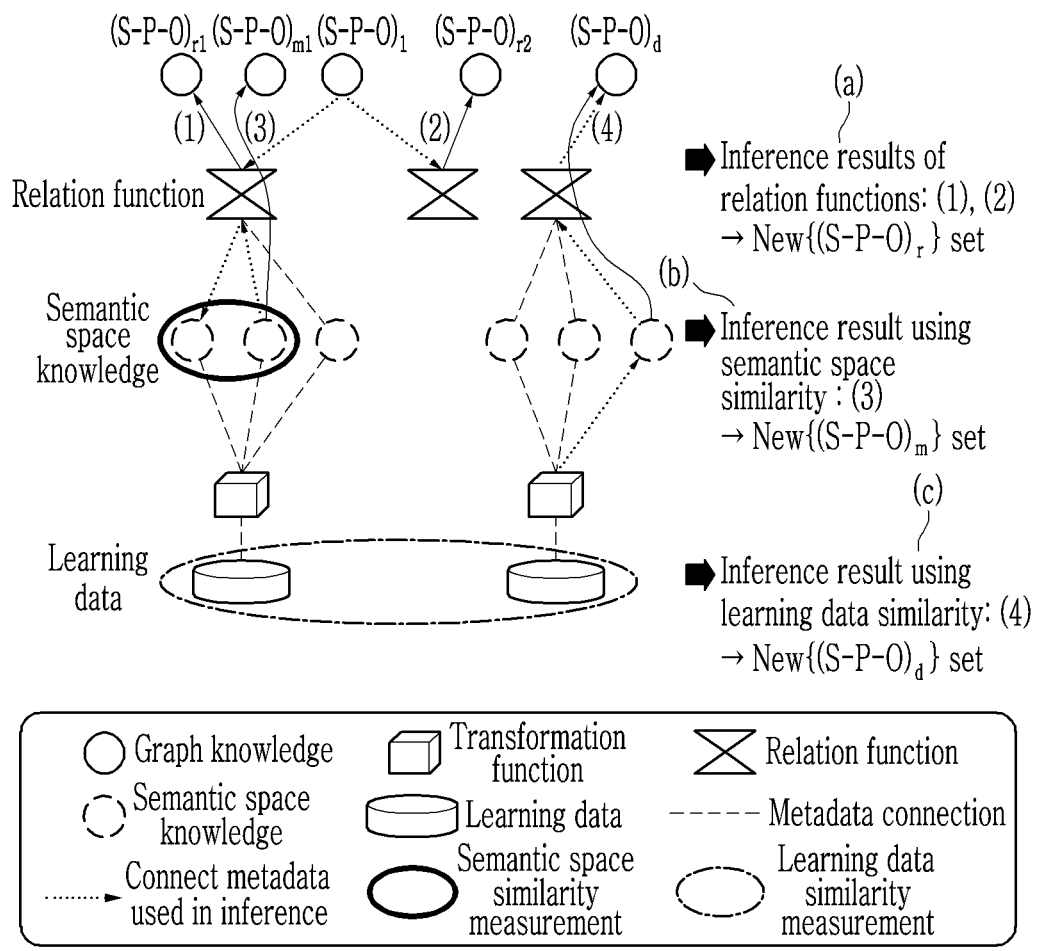
FIG. 5 is an exemplary diagram illustrating multi-level knowledge search according to an embodiment of the present disclosure.

FIG. 5 is an exemplary diagram illustrating multi-level knowledge search according to an embodiment of the present disclosure.

First, inference is performed using a plurality of relation functions (also referred to as first inference for convenience of explanation) (in (a) of FIG. 5). After several times of knowledge growth, the same knowledge has several relation functions. Based on these various relation functions, knowledge is inferred using graph inference techniques (inference using graph characteristic models). For example, knowledge is inferred based on relation functions for random knowledge $(S-P-O)_{r1}$. Inference results using several relation functions (e.g., $(S-P-O)_{r1}$ and $(S-P-O)_{r2}$ in FIG. 5) may be different. At this time, the size of the energy function used at the time of learning is normalized with respect to the inference results (a new $\{(S-P-O)_r\}$ set), and the subject-predicate-object (S-P-O) triple with a larger value can be selected by comparing the normalized values. However, the present disclosure is not limited thereto.

Next, inference using semantic space knowledge is performed (also referred to as second inference for convenience of explanation) (in (b) of FIG. 5). A semantic vector similar to a semantic vector (a semantic vector of a valid S-P-O triple) in the semantic space connected to the relation function used in the first inference above is selected, and a new knowledge S-P-O triple (e.g. $(S-P-O)_{m1}$) based on the relation function corresponding to these semantic vectors is generated. At this time, in order to measure the similarity between semantic vectors, various methods such as cosine similarity and Hamming distance can be used.

Then, inference is performed using the learning data (also referred to as third inference for convenience of explanation) (in (c) of FIG. 5). Other similar learning data based on learning data (learning data related to inference in (a) and (b) of FIG. 5) is searched, and predictive inference is performed on semantic space knowledge, relation functions, and graph knowledge linked to the similar learning data. That is, a semantic vector connected to learning data similar to the learning data is searched, and predictive inference is performed based on a relation function corresponding to the searched semantic vectors to obtain new knowledge (e.g. $(S-P-O)_d$). In this case, the above-described predictive inferring methods may be used. Meanwhile, when searching for similar learning data, similar learning data can be found by vectorizing the properties of the learning data and comparing them with a method such as cosine similarity or Hamming distance. Alternatively, similar learning data can be found using various methods such as using a similarity measurement table between learning data in advance. When obtaining the similarity with the semantic vector of the effective knowledge of the original space in the semantic space related to similar learning data, the dimensions of the higher-order semantic vectors are reduced, the similarity is obtained by multiplying the internal and corresponding learning data between two vectors with reduced dimensions, the most similar semantic vector from semantic vectors of a plurality of learning data, that is, the most similar semantic vector, is selected based on the obtained similarities, and new knowledge is inferred by using a relation function related to the selected semantic vector.

Figure 6:
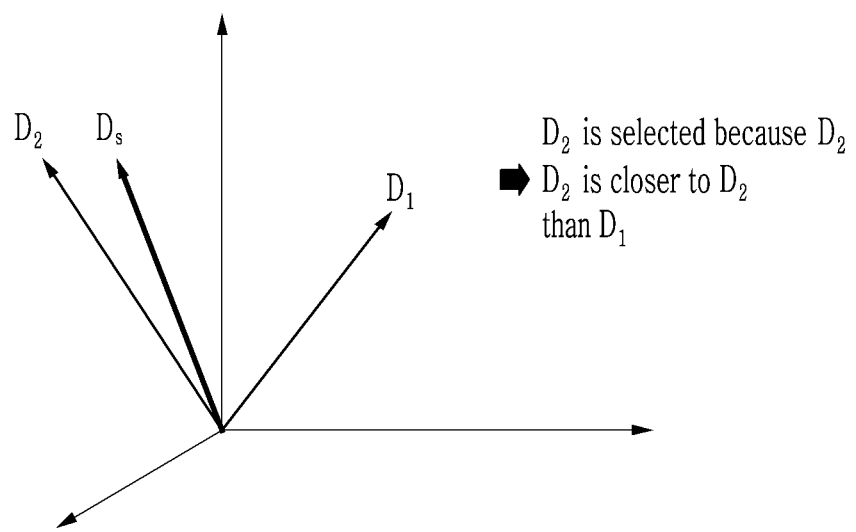
FIG. 6 is an exemplary diagram illustrating measurement of similarity of learning data according to an embodiment of the present disclosure.

FIG. 6 is an exemplary diagram illustrating measurement of similarity of learning data according to an embodiment of the present disclosure.

For example, when the similarity between learning data is $D_1$, $D_2$, and $D_S$, the learning data of $D_2$ is selected because $D_2$ is closer to the learning data of $D_S$ than $D_1$.

By performing inference using the similarity of the learning data, new knowledge may be generated as shown in (c) of FIG. 5.

As described above, by performing the first inferring, the second inferring, and the third inferring with respect to an inferring request, the answer to the inferring request, that is, the answer to the question, may be found. At this time, different weights are given to the results of the first inferring, the results of the second inferring, and the results of the third inferring, and a final inferring result can be derived based on the weights. For example, as the higher layers are inferred from more reliable knowledges, high confidence is given to the inference results of the upper layers. The final confidence (also referred to as an overall weight) of individual inference results may be obtained through the product of the weight and confidence used in the inferences from each layer. Then, the inference result having a final confidence greater than or equal to a threshold value among the final confidence of individual inference results can be finally used. Such hierarchical confidence may be arbitrarily set by a knowledge base designer or may be determined using the accuracy of inference based on statistics.

Specifically, new knowledge can be inferred by performing inference on a plurality of relation functions according to the first inference and weighting the result.

In addition, according to the second inference, inference can be performed with a semantic vector similar to the semantic vector of valid knowledge in the semantic space, and a weight is given to the result to infer new knowledge.

In addition, according to the third inference, the similarity between the learning data is used to perform the inference using the relation function connected to the similar learning data, and a weight is given to the result to infer new knowledge.

Figure 7A:
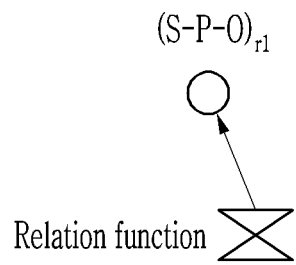
FIG. 7A to 7C are exemplary diagrams of performing inference according to an embodiment of the present disclosure.
Figure 7B:
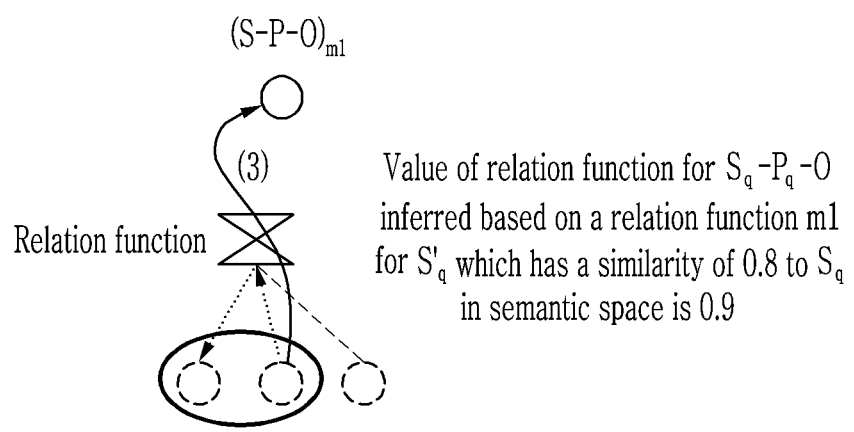
Figure 7C:
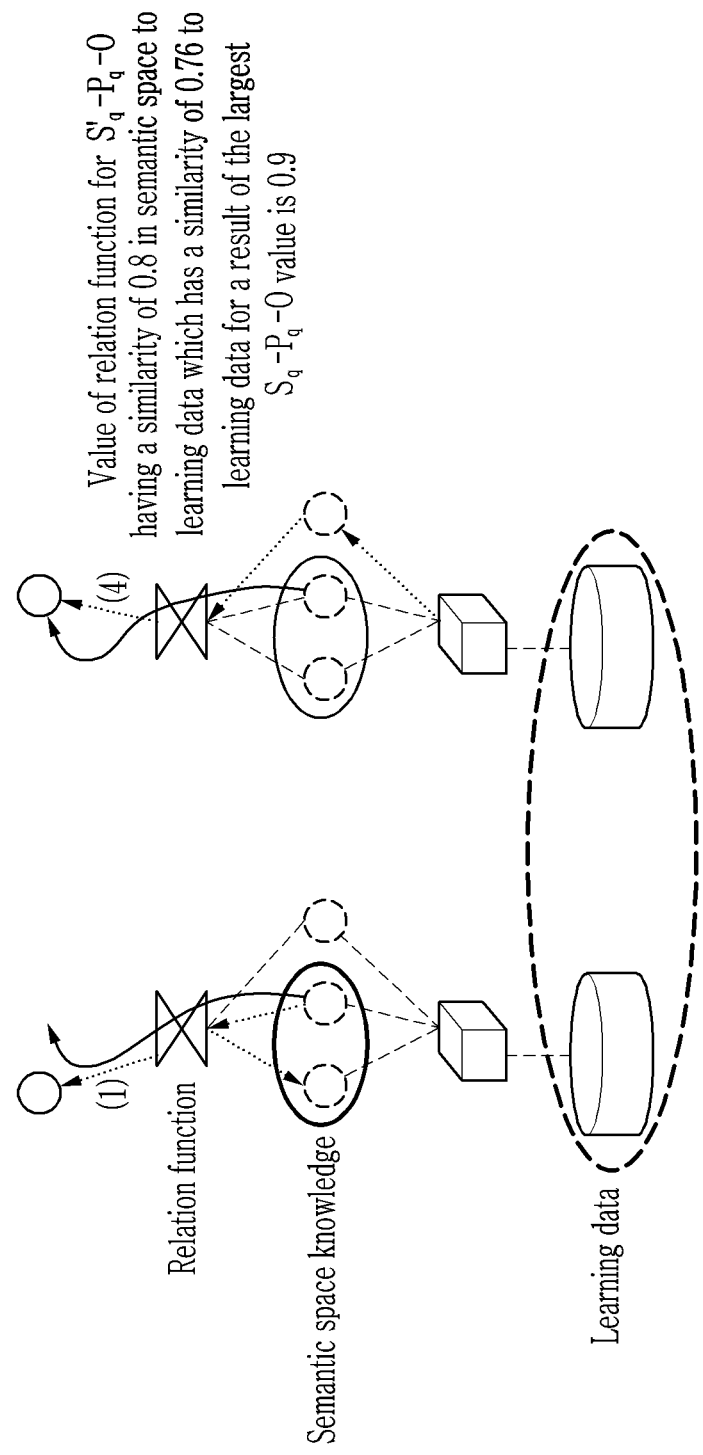

FIG. 7A to 7C are exemplary diagrams of performing inference according to an embodiment of the present disclosure.

Inference in which S-P is given as an inference query and valid O is obtained, inference in which S-O is given as an inference query and valid P is obtained, or inference in which P-O is given as an inference query and valid S is obtained is may be considered.

The relation function learns the validity of P, and the semantic space learns the vectorization of entities S and O.

For example, as shown in FIG. 7A, when $S_q$ and $P_q$ are given as inference queries, at the time of first inference, valid O is obtained through the relation function, and the inference result $(S-P-O)_{r1}$ is obtained. Here, the first inference outputs the validity of P through a relation function, sorts the inference results for validity, and uses the validity value as a weight. For example, a relation function value of 0.9, which is the validity value of P for $S_q$-$P_q$-O inferred based on the relation function r1, is obtained, and is used as a relation function weight.

Meanwhile, the second inference uses the similarity of entities in the semantic space for S or P used in the query as a weight. For example, as shown in FIG. 7B, when $S_q$ and $P_q$ are given as inference queries, at the second inference, S'q having a semantic vector having a similarity of 0.8 to a semantic vector of $S_q$ in a semantic space is selected, and $S'_q$-$P_q$-$O((SPO)_{m1})$ is obtained based on the relation function m1 with respect to $S'_q$, and a relation function value of 0.9 is obtained. Here, a similarity of 0.8 (semantic space similarity) may be used as a weight for the second inference result.

Meanwhile, in the second inference, when a semantic space similarity is greater than or equal to a threshold value, the validity value of the relation function is used, and the similarity between entities is multiplied by the validity value of the relation function to be used as a weight of the inference result. For example, a value of 0.72 obtained by multiplying a relation function value of 0.9 and a similarity of 0.8 may be used as a weight for the second inference result.

On the other hand, in the third inference, the learning data connected by metadata to the inference result having the greatest relation function validity for the inference query is set as basic learning data. Then, inference is performed on a knowledge graph and a semantic space knowledge connected by metadata to learning data whose similarity to the basic learning data is greater than a threshold and semantic space knowledge to induce the third inference. At this time, the similarity between the learning data is multiplied by a weight and may be used as a weight for the inference result. Accordingly, the embedded knowledge may be utilized for inference by utilizing multi-level information through semantic space similarity and learning data similarity.

For example, as shown in FIG. 7C, when $S_q$ and $P_q$ are given as inference queries, the learning data connected by metadata to the inference result (e.g., $S_q$-$P_q$-O) having the greatest relation function validity in the inference result (S-P-O) d according to the first inference is set as basic learning data. Learning data having a similarity of 0.7 to the basic learning data is selected, and $S'_q$ having a semantic vector that has a similarity of 0.8 to a semantic vector connected to the selected learning data is selected. $S'_q$-$P_q$-$O((S-P-O)_{r2})$ is obtained based on the relation function r2 for $S'_q$, and then a relation function value of 0.9 is obtained. Here, a value of 0.504 obtained by multiplying the relation function value of 0.9 and the semantic space similarity of 0.8 by the similarity of 0.7 between the learning data may be used as a weight for the third inference result.

The final confidence obtained for each inference performed as described above, that is, the overall weight may be as shown in Table 1 below.

TABLE 1

| Inference layer | Relation function weight | Semantic space similarity | Learning data similarity | Layer confidence | Overall weight |
|---|---|---|---|---|---|
| First inference | 0.9 | 1 | 1 | 1 | 0.9 |
| Second inference | 0.9 | 0.8 | 1 | 0.8 | 0.576 |
| Third inference | 0.9 | 0.8 | 0.7 | 0.7 | 0.28224 |

Based on giving high confidence to the inference result of the upper layer, as in the example in Table 1 above, a layer confidence of 1 is given to the layer of the first inference (or the first layer), a layer confidence of 0.8 is given to the layer of the second inference (or the second layer), and a layer confidence of 0.7 is given to the layer of the third inference (or the third layer). For example, the overall weight (0.9) obtained by multiplying the weight of the first inference of 0.9 by the layer confidence (1) of the first layer in which the inference was performed is finally obtained, the overall weight (0.576) obtained by multiplying the weight of the second inference of 0.72 by the layer confidence (1) of the first layer and the layer confidence (0.8) of the second layer in which the inference was performed is finally obtained, and the overall weight (0.28224) obtained by multiplying the weight of the third inference of 0.504 by the layer confidence (1) of the first layer, the layer confidence (0.8) of the second layer, and the layer confidence (0.7) of the third layer in which the inference was performed is finally obtained. After this, only the inference result having a final confidence greater than or equal to a threshold value among the overall weights, that is, the final confidence levels, may be used as a valid inference result.

Knowledge can be grown by using this multi-level knowledge inference. By performing multi-level knowledge inference from new facts extracted from interaction information such as new learning data or conversation, missing knowledge about current learning data is completed, and knowledge can be grown. This will be described in more detail later.

Meanwhile, the types of knowledge that can be extracted according to the type of learning data are shown in Table 2 below.

TABLE 2

| Type of learning data | Learning data | Semantic space | Graph knowledge | Predictive inference |
|---|---|---|---|---|
| Structured | ○ | X | ○ | ○ |
| Semi-structured | ○ | ○ | ○ | ○ |
| Unstructured | ○ | Δ | Δ | Δ |

Referring to Table 2, there is no semantic space knowledge because structural learning data can be converted directly into graph knowledge. Therefore, during predictive inference, it is possible to identify the same effective entity by using entity resolution between graphs and use this part for inference.

Since the semi-structured learning data has knowledge of all layers, knowledge inference is possible using all techniques according to an embodiment of the present disclosure.

Since unstructured learning data has no label or tagging with human supervised knowledge in the learning data, it is necessary to construct semantic space and graph knowledge with techniques using unsupervised learning or self-supervised learning. If such higher-level knowledge is configured, knowledge inference may be performed using all techniques according to an embodiment of the present disclosure.

On the other hand, the knowledge element management unit 60 is configured to connect learning data, a transformation function, a semantic vector set (semantic space knowledge) of the semantic space, a relation function, a graph knowledge set, and the like, and store and manage them in a database as metadata.

When each knowledge element is required in the knowledge growth process through knowledge prediction inference, the knowledge element management unit 60 provides the corresponding metadata according to the call of another component, so that the component acquires the knowledge element.

FIG. 8 to FIG. 11 are exemplary diagrams showing metadata according to an embodiment of the present disclosure.

Figure 8:
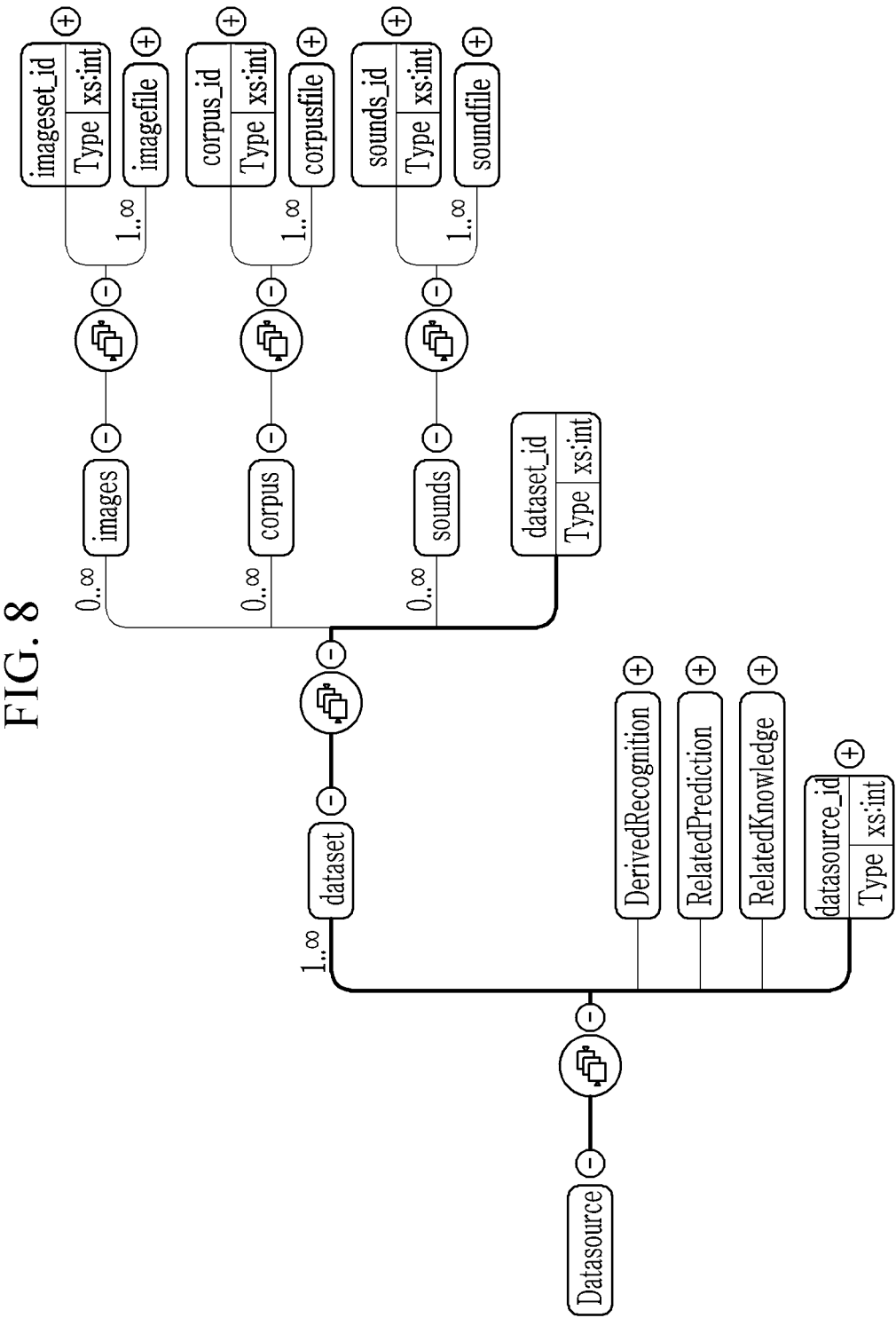
FIG. 8 to FIG. 11 are exemplary diagrams showing metadata according to an embodiment of the present disclosure.

In learning data metadata, as illustrated in FIG. 8, multimodal learning data such as image/corpus/audio is in correspondence with the identifier (e.g. dataset_id) of one data set, and for each learning data, a data identifier (e.g. image-set_id), and a file (e.g. imagefile) are associated. In addition, new knowledge based on predictive inferring is associated.

Figure 9:
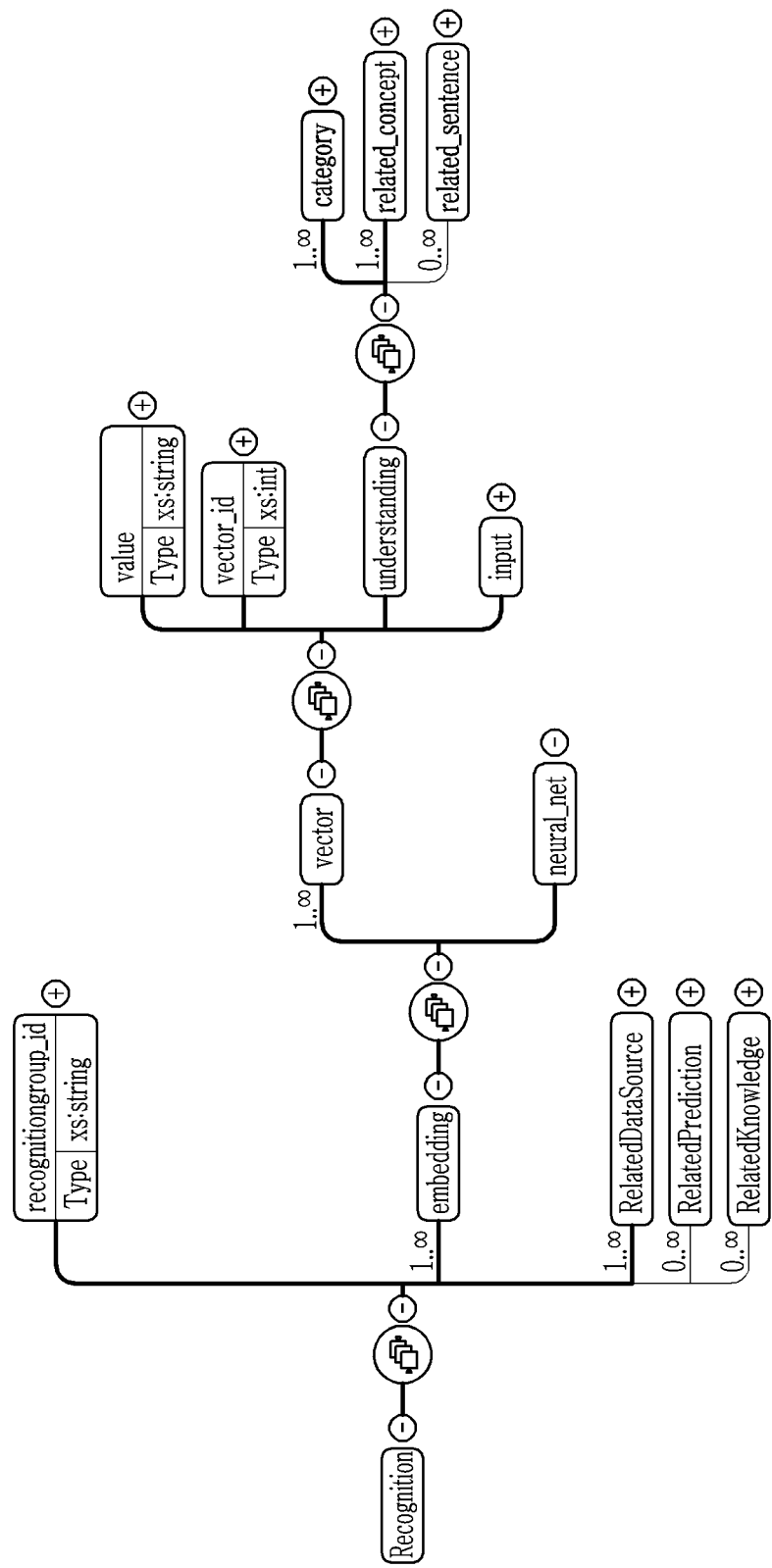

As for the semantic space knowledge metadata, as illustrated in FIG. 9, a semantic vector and a transformation function (e.g. neural_net) are associated in correspondence with the learning data, and a vector value, an identifier (vector_id), and the like are in correspondence with the semantic vector. In addition, new knowledge based on predictive inferring is associated.

Figure 10:
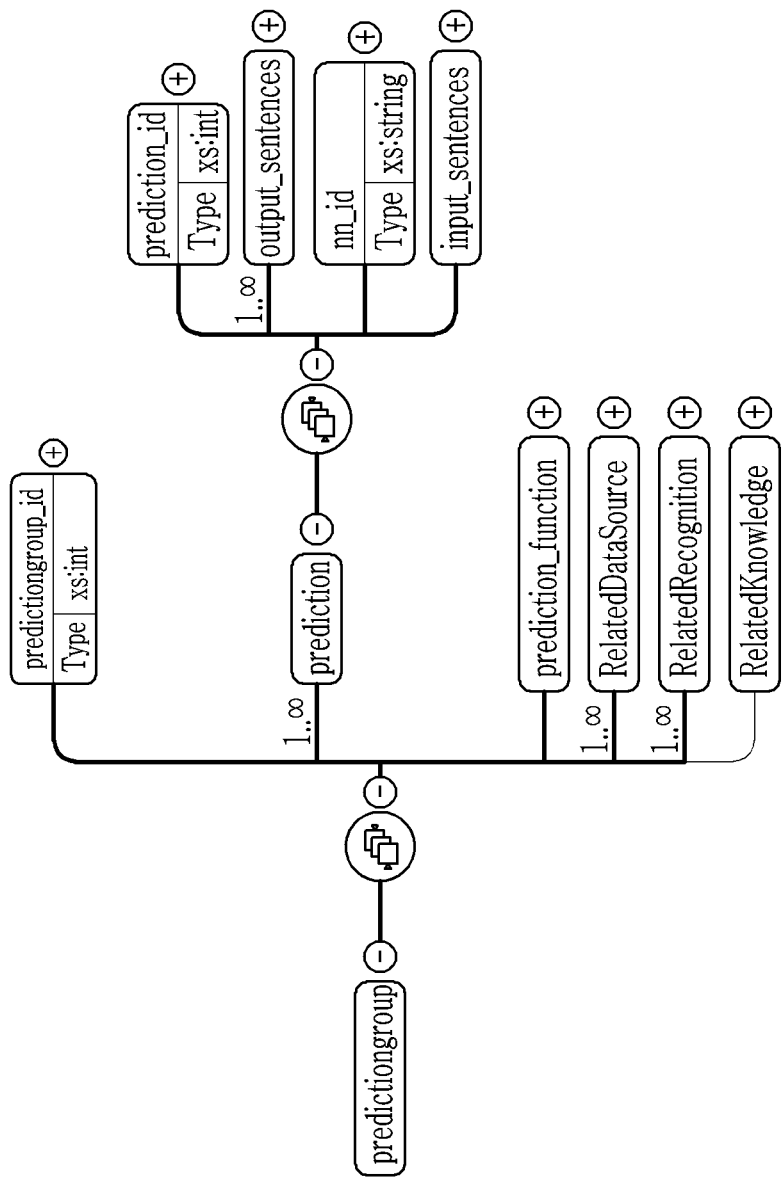

As illustrated in FIG. 10, an inference result (e.g. prediction_id) related to prediction inference using a relation function is in correspondence with the relational knowledge learning metadata.

Figure 11:
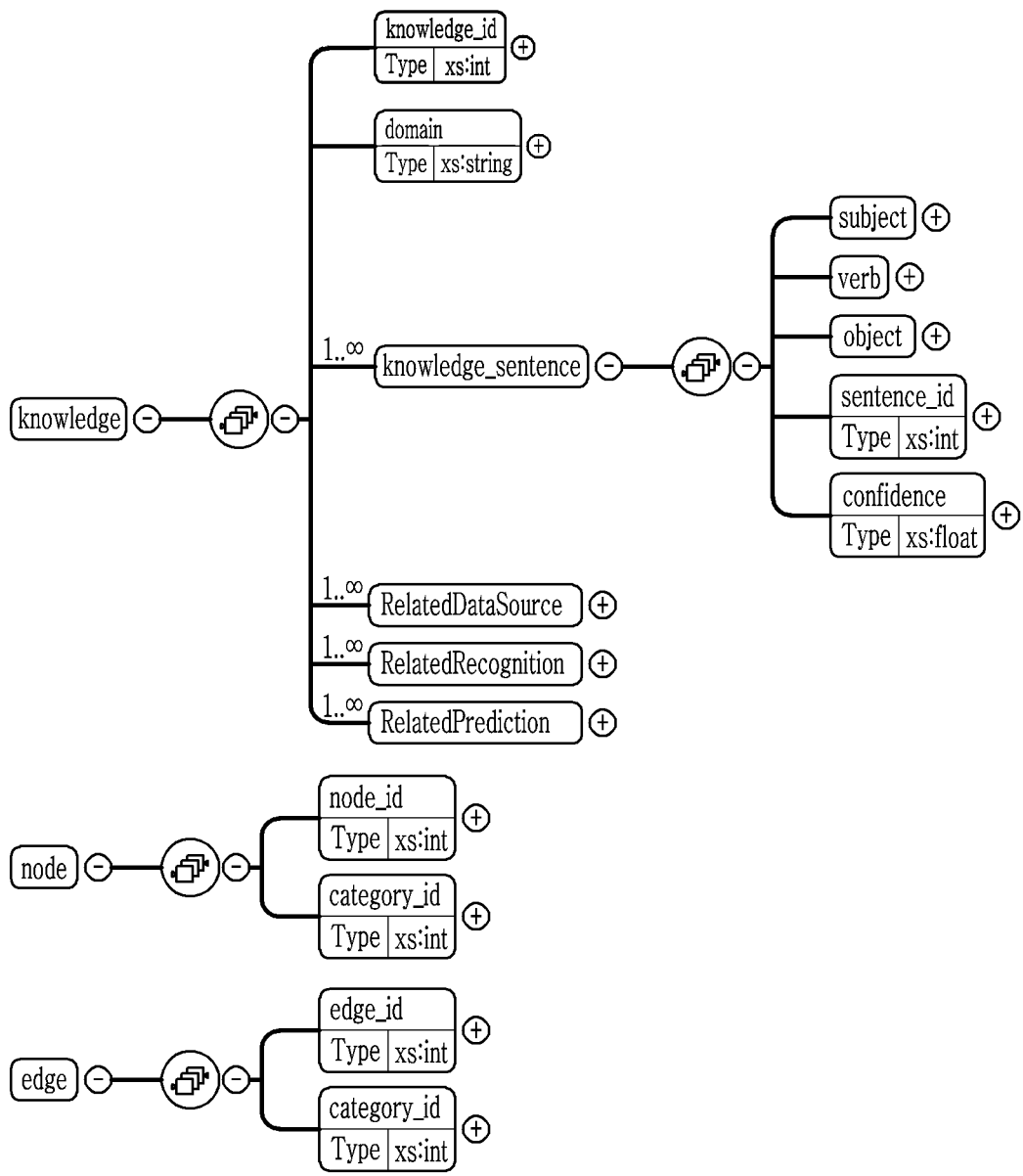

As illustrated in FIG. 11, the graph knowledge metadata is based on a graph in which a semantic vector is a node and a relation is an edge, and in connection with this graph knowledge, a relation function, a semantic vector associated therewith, learning data, and new graph knowledge based on predictive inference are associated.

On the other hand, the knowledge retrieval processing unit 80 is configured to provide knowledge corresponding to a knowledge request. The knowledge retrieval processing unit 80 performs a graph search in the graph knowledge storage unit 30 according to the knowledge request to determine whether the corresponding knowledge exists, that is, whether a knowledge triple (S-P-O) exists. If the knowledge exists, the knowledge retrieval processing unit 80 fetches and outputs the knowledge from the knowledge storage unit 30. If there is no corresponding knowledge, the knowledge retrieval processing unit 80 may search for knowledge elements related to the corresponding knowledge through the inference processing unit 70 to perform a search for a plurality of other graphs.

Figure 12:
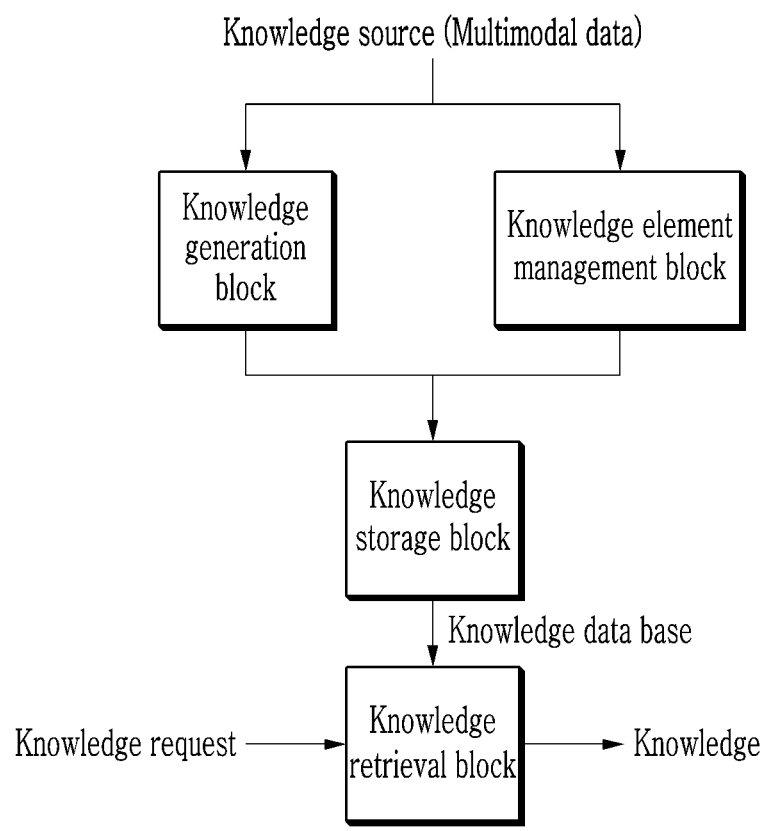
FIG. 12 is a diagram illustrating an example of functionally classifying a multi-layered knowledge base system according to an embodiment of the present disclosure.

The learning data storage unit 10, the semantic space knowledge storage unit 20, the graph knowledge storage unit 30, the semantic space learning unit 40, the learning unit 50, the knowledge element management unit 60, the inferring processing unit 70, and the knowledge retrieval processing unit 80 of the multi-layered knowledge base system 1, as above, are functionally classified as shown in FIG. 12.

FIG. 12 is a diagram illustrating an example of functionally classifying a multi-layered knowledge base system according to an embodiment of the present disclosure.

A knowledge generation block performs a function of generating knowledge by receiving learning data and includes the learning unit 40, the relational knowledge learning unit 50, and the inference processing unit 70 which generates knowledge by receiving learning data, which is a source of knowledge, from the learning data storage unit 10 of FIG. 1.

A knowledge element management block performs a function of managing metadata of knowledge of each layer, and may correspond to the knowledge element management unit 60 of FIG. 1.

A knowledge storage block performs a function of storing generated multi-layered knowledge, and may include a graph knowledge storage unit 30 and a semantic space knowledge storage unit 20 of FIG. 1. Alternatively, it may include a learning data storage unit 10.

A knowledge retrieval block performs a function of retrieving and providing knowledge from the knowledge storage block according to a knowledge request, and corresponds to the knowledge retrieval processing unit 80 of FIG. 1.

Next, a processing method according to an embodiment of the present disclosure will be described based on a multi-layered knowledge base system having such a structure.

Figure 13:
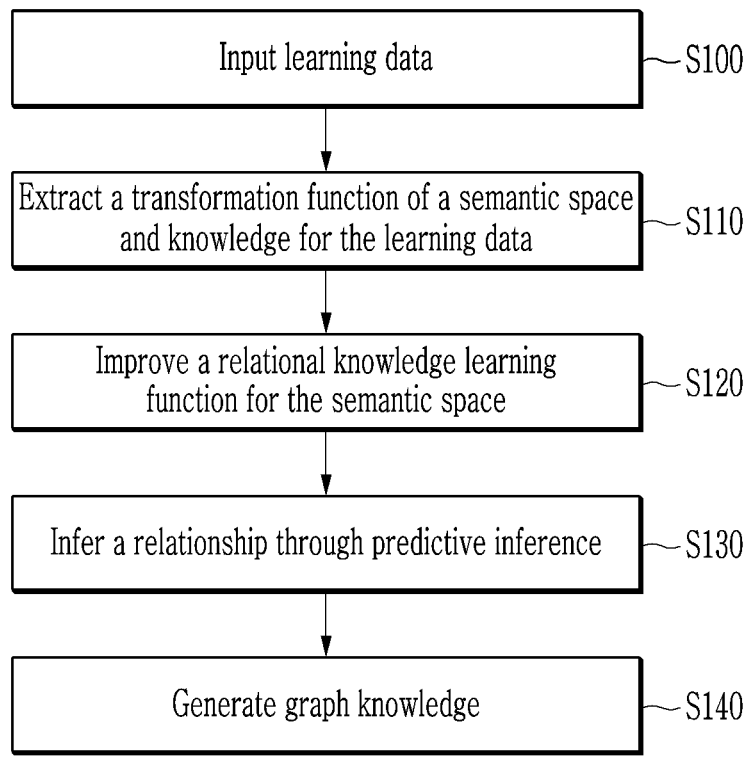
FIG. 13 and FIG. 14 are flowcharts of a processing method according to an embodiment of the present disclosure.

FIG. 13 is a flowchart of a processing method according to an embodiment of the present disclosure.

In an embodiment of the present disclosure, a processing method of growing knowledge is performed based on a multi-layered knowledge base system, and the growth of knowledge may be achieved through a method of completing graph knowledge generated from learning data through multi-layered predictive inference.

As shown in FIG. 13, when learning data is input (S100), a transformation function of a semantic space and semantic space knowledge for the learning data are extracted from the semantic space knowledge storage unit 20 (S110). For example, learning data similar to the input learning data is searched. In this case, similar learning data can be found based on the similarity between learning data. Then, semantic space knowledge (semantic vectors) and transformation functions connected to the searched learning data are extracted.

Thereafter, the relational knowledge learning function for the semantic space is improved (S120). For example, a relation function corresponding to a semantic vector corresponding to the extracted semantic space knowledge is improved (modified).

For example, if there are positive and negative cases in the learning data, the relation function may be improved by learning the relation function to predict the validity of the S-P-O relation or by changing parameters of the relation function to improve a specific measure. Knowledge graph completion techniques such as RESCAL, TransE, and a path ranking algorithm (PRA) of the knowledge graph can be used.

Then, the relation is inferred through predictive inference to generate graph knowledge (S130 and S140). For example, based on the relation function improved in step 120 or the relation function extracted in step S110, a relation is inferred through predictive inference for a relation that does not exist. New graph knowledge is created according to this relation inference. That is, new graph knowledge is created using the newly inferred relation as an edge and related semantic vectors as nodes.

In addition, in another embodiment of the present disclosure, the growth of knowledge may be achieved by generating new knowledge from new fact information.

Figure 14:
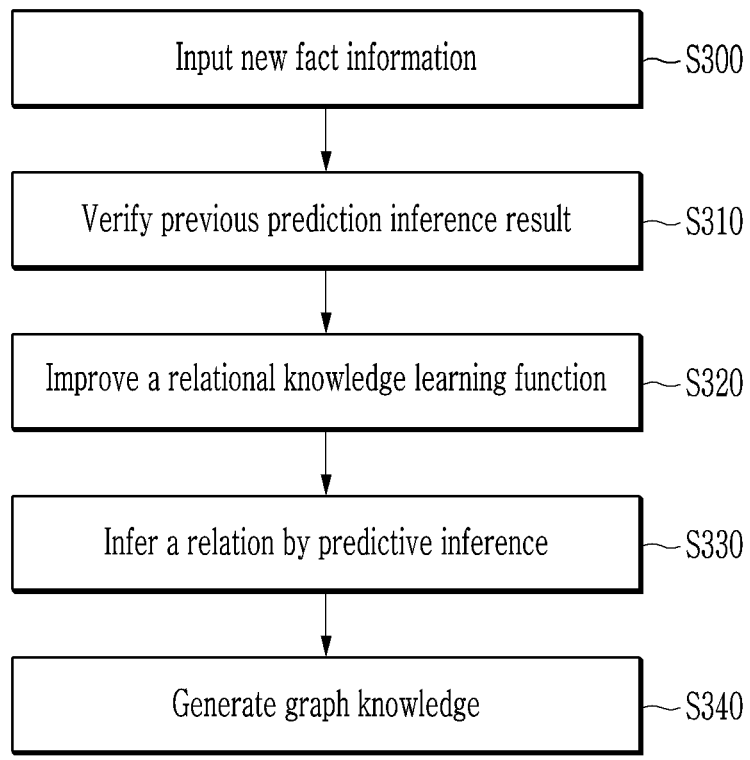

FIG. 14 is a flowchart of a processing method according to an embodiment of the present disclosure.

As shown in FIG. 14, when new fact information is input (S300), the previous prediction inference result is verified (S310). New factual information can also be entered through new data sets or interactions with people, such as conversations. The new fact is converted into a triple form of S-P-O, and each entity of S-P-O is in a state in which multimodal data is converted into a semantic vector of a semantic space. The new fact is responsible for verifying the relation created by multi-level predictive inference for relations that do not exist in previous learning data. Based on the new facts, the existing relation is verified. For example, for S-P-O for a new fact, if the overall weight of the relation function is less than a threshold value, the generated relation may be verified through a method of re-learning the relation function including the new fact. Or, for S-P-O connected to the S-P-O for the new fact, when the average effective value (the effective value is calculated using the relation function using S, P, O, respectively, and the effective values are averaged) is less than a specific value, the generated relation may be verified by performing additional learning of the relation function.

Thereafter, a learning function (the relation function) of the relational knowledge is modified so that the incorrectly predicted relation is discarded according to the verification result. That is, the relational knowledge learning function for the semantic space, that is, the relation function, is improved (S320). Meanwhile, the new fact may be used as an input for determining a threshold value when improving a learning function (relation function) of relational knowledge.

Then, a relation is inferred through predictive inference to generate graph knowledge (S330 and S340). New facts can trigger incomplete relations to existing graph knowledge by acting as learning data for new relational knowledge learning. Therefore, based on the new relational knowledge function, that is, the relation function improved in step S320, new knowledge is generated and grown through a new multi-layered predictive inference.

When explaining this process with a specific example, a new fact is converted into a triple form of the S-P-O, a semantic vector similar to the semantic vector of the triple of the converted S-P-O is searched from the semantic space knowledge storage unit 20, and a new knowledge S-P-O triple is generated based on the relation function by using the semantic vector and the similar semantic vector. In addition, the relation function used to generate the new knowledge S-P-O triple may be improved, and new knowledge may be generated by performing new predictive inference based on the improved relation function.

Generating new knowledge from new facts (fact information) can be performed for each domain and task.

Figure 15:
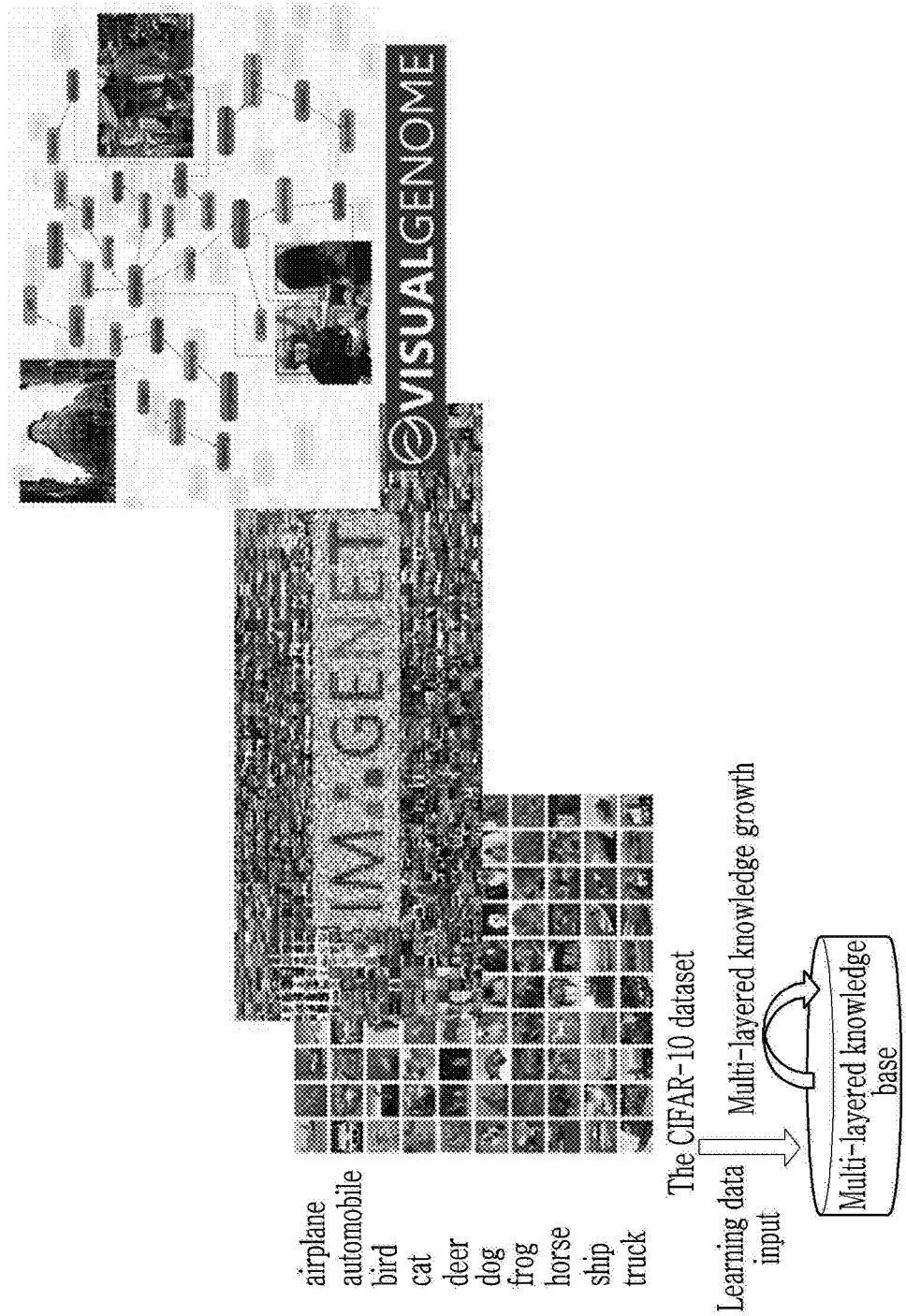
FIG. 15 and FIG. 16 are exemplary diagrams illustrating knowledge growth based on input of new fact information according to an embodiment of the present disclosure.
Figure 16:
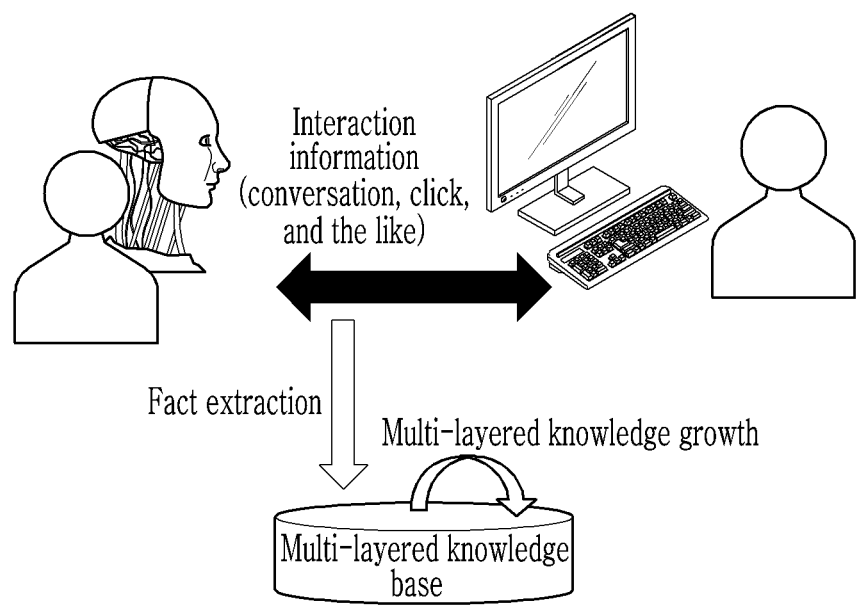

FIG. 15 and FIG. 16 are exemplary diagrams illustrating knowledge growth based on input of new fact information according to an embodiment of the present disclosure.

For example, as shown in FIG. 15, heterogeneous learning data having different domains and tasks may be successively inputted into a multi-layered knowledge base system and used for convergence of individual knowledge.

In addition, as shown in FIG. 16, knowledge is extracted from interactions including interpersonal or interpersonal-machine conversations in an interactive system, and the extracted knowledge is input as fact information to a multi-level knowledge base system to be grown.

The multi-layered knowledge base knowledge inference and growth by the processing method according to the embodiment of the present disclosure is performed using metadata information on the connection relation between the knowledge layers.

In this case, considering that there are very many connections and it takes a lot of time due to an increase in the amount of calculation when predictive inference is performed using them, in the embodiment of the present disclosure, additionally, a method of performing the inference on the knowledge generated for each domain in parallel and converging the results of inference to derive a final result and a method of shortening inference time by adjusting the depth of progression from multi-level knowledge inference to lower layers are provided. All of these methods reduce the amount of inferred knowledge compared to the case of performing predictive inference on the entire knowledge base. In addition, the above two methods can be applied equally to the case of knowledge retrieval.

Figure 17:
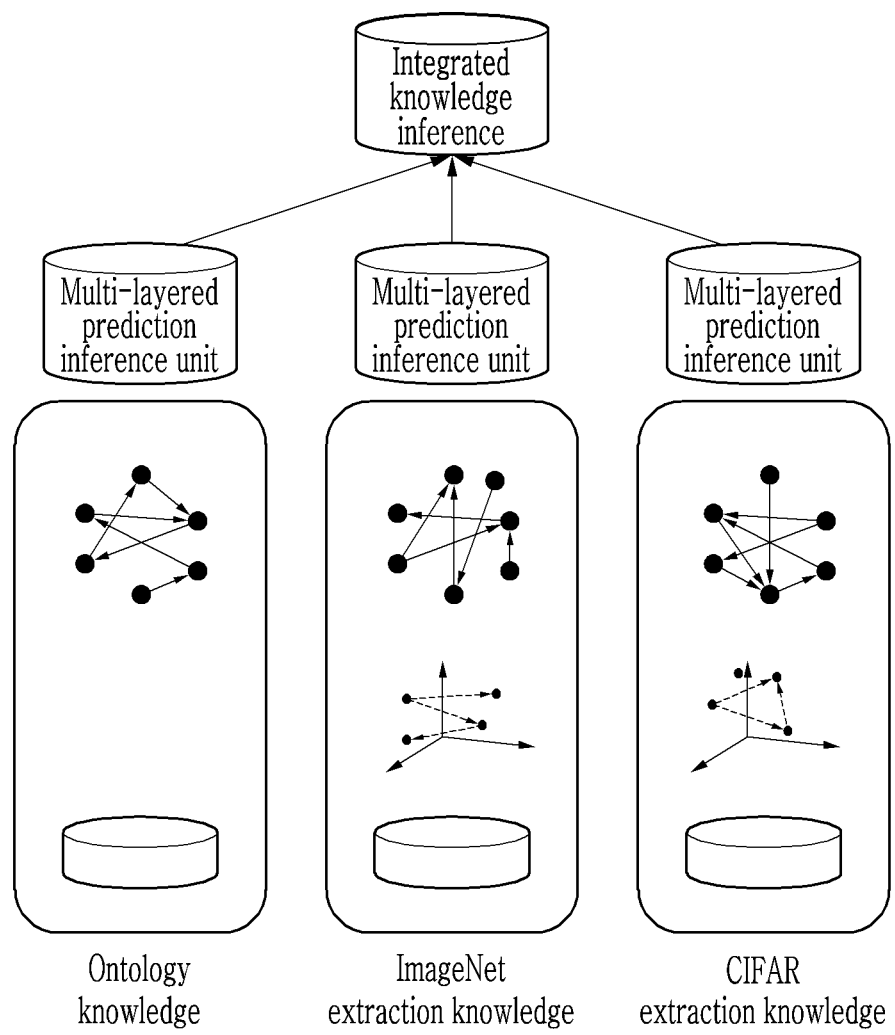
FIG. 17 is a diagram illustrating an example of deriving a final result by performing inference on knowledge generated for each domain in parallel and fusing the results of inference according to an embodiment of the present disclosure.

FIG. 17 is a diagram illustrating an example of deriving a result by performing inference on knowledge generated for each domain in parallel and convergence of the results according to an embodiment of the present disclosure.

For example, as shown in FIG. 17, each predictive inference unit may be configured for each domain. For example, the inference processing unit 70 may be configured to include a prediction inference unit for each domain.

The prediction inference units can be executed in parallel on the same machine or in parallel via a distributed machine. In the case of merging the inference results of the prediction inference units, if the expression of the S-P-O triple of each prediction inference unit is different, the inferring results may be merged using an entity resolution technique. In addition, in the case of inference, query, knowledge search, or retrieval, a method of extracting task information and giving priority to the inference result of a prediction inference unit suitable for the extracted task among the inference results may be used.

Figure 18:
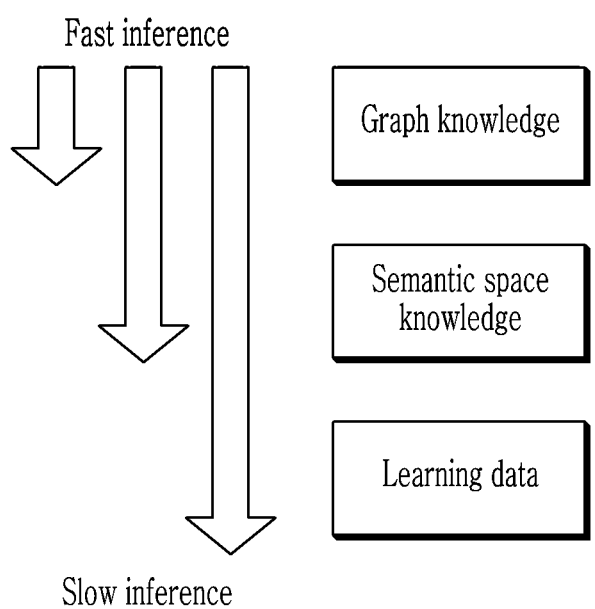
FIG. 18 is a diagram illustrating an example of performing inference by adjusting a depth of progression to a lower layer in multi-layered knowledge inference according to an embodiment of the present disclosure.

FIG. 18 is a diagram illustrating an example of performing inference by adjusting a depth of progressing to a lower layer in multi-layered knowledge inference according to an embodiment of the present disclosure.

Inference execution time can be adjusted by limiting the depth of inference progressing from multi-level knowledge inference to lower levels. The depth of inferring can be limited to a time that satisfies the time required for inference, query, knowledge search, or retrieval, or the time required for inference. When there is a time limit, the search layer can be limited accordingly, and search, that is, inference, can be performed only for the layer that can be searched within the time limit.

In addition, the number of inferences can be limited by the number of metadata connections. In this case, various methods such as a method of calculating a total score by assigning a weight to the connection of the metadata for each layer, and limiting the connection of the metadata based on the score, may be used. In addition, it is also possible to determine the value for the limited depth by inferring the relation between the requested response time and the predicted inference time using a regression analysis between a query or task and the limit depth, or using a neural network such as a recurrent neural network (RNN).

According to such an embodiment of the present disclosure, the problem of losing information and knowledge of multimodal learning data because the existing knowledge base has a structural or explicit knowledge expression and processing method such as a text-oriented database, a corpus, a graph, etc., may be solved. Knowledge extracted from multimodal learning data can be combined with explicit knowledge as well as intrinsic knowledge to become knowledge and grow the 30 knowledge base.

Figure 19:
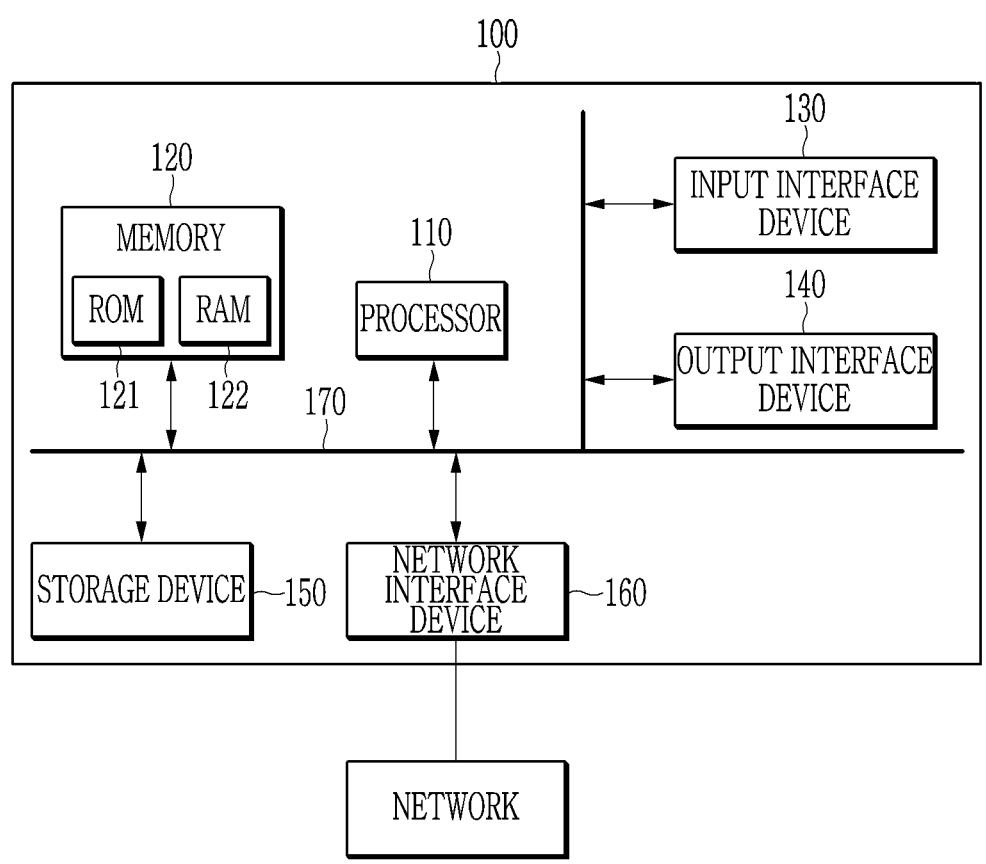
FIG. 19 is a structural diagram illustrating a computing device for implementing a processing method according to an embodiment of the present disclosure.

FIG. 19 is a structural diagram illustrating a computing device for implementing a processing method according to an embodiment of the present disclosure.

As shown in the accompanying FIG. 19, a processing method according to an embodiment of the present disclosure may be implemented using the computing device 100.

The computing device 100 may include at least one of a processor 110, a memory 120, an input interface device 130, an output interface device 140, a storage device 150, and a network interface device 160. Each of the components may be connected by a bus 170 to communicate with each other. In addition, each of the components may be connected through an individual interface or an individual bus centered on the processor 110 instead of the common bus 170.

The processor 110 may be implemented in various types, such as an application processor (AP), a central processing unit (CPU), a graphical processing unit (GPU), etc., and may be any semiconductor device that executes commands stored in the memory 120 or the storage device 160. The processor 110 may execute a program command stored in at least one of the memory 120 and the storage device 150. This processor 110 may be configured to embody the functions and methods described based on FIGS. 1 to 17 above. For example, the processor 110 may be configured to perform functions of a semantic space learning unit, a relational knowledge learning unit, a knowledge element management unit, an inference processing unit, and a knowledge retrieval processing unit.

The memory 120 and the storage device 150 may include various types of volatile or nonvolatile storage media. For example, the memory may include read-only memory (ROM) 121 and random access memory (RAM) 122. In an embodiment of the present disclosure, the memory 120 may be located inside or outside the processor 110, and the memory 120 may be connected to the processor 110 through various known means.

The storage device 150 may include a learning data storage unit, a semantic space knowledge storage unit, and a graph knowledge storage unit.

The input interface device 130 is configured to provide data to the processor 110, and the output interface device 140 is configured to output data from the processor 110.

The network interface device 160 may transmit or receive signals with other entities through the network.

The computing device 100 having such a structure is referred to as a multi-layered knowledge base system, and may implement a processing method according to an embodiment of the present disclosure.

In addition, at least some of the processing methods according to an embodiment of the present disclosure may be implemented as a program or software executed in the computing device 100, and the program or software may be stored in a computer-readable medium.

In addition, at least some of the processing methods according to an embodiment of the present disclosure may be implemented with hardware that can be electrically connected to the computing device 100.

According to embodiments, intrinsic information of multimodal learning data such as image/video/sound as well as text-based data such as language or graph and interrelated information are extracted, and information in addition to existing knowledge based on this knowledge base can be grown by convergence of not only explicit knowledge but also implicit knowledge without loss of knowledge.

In addition, it is possible to speed up the knowledge base by limiting the degree of use of intrinsic information in order to infer knowledge at a high speed. Therefore, since the multimodal learning data is continuously used for learning, it is possible to grow knowledge while reducing loss of knowledge and information about previously learned knowledge even for heterogeneous learning data and learning tasks. That is, learning data sets having heterogeneous domains and tasks can be effectively converged to become knowledge while reducing knowledge loss.

In addition, by applying a variety of learning tasks and learning data, which is more effective in multimodal knowledge inference, more information is accumulated in the knowledge base, thereby enabling various services into one knowledge base. In addition, since knowledge transfer occurs between heterogeneous domains and tasks, it is possible to expect improvement in performance such as accuracy for each individual task. In addition to knowledge inference, the generated knowledge can be used for a variety of services such as multimodal data management and search, retrieval, or dialogue generation knowledge extraction.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiment s may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiment s may be implemented by software, and the software may be recorded on a recording medium. The components, functions, and processes described in the embodiment s may be implemented by a combination of hardware and software.

The method according to embodiment s may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiment s may be implemented as a combination in a single embodiment. In contrast, various features described in the specification in the context of a single embodiment may be implemented in multiple embodiment s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiment s in all embodiment s, and it should be understood that the above-described program components and apparatuses may be incorporated into a single software product or may be packaged in multiple software products. It should be understood that the embodiment s disclosed herein are merely illustrative and are not intended to limit the scope of the disclosure. It will be apparent to one of ordinary skill in the art that various modifications of the embodiment s may be made without departing from the spirit and scope of the claims and their equivalents.

What is claimed is:

1. A processing method for a knowledge base system, comprising:
    performing, by a processor, semantic space learning of converting learning data into a semantic vector, which is a vector of semantic space, by learning a transformation function based on a plurality of learning data;
    performing, by the processor, relational knowledge learning of acquiring a relation between the semantic vectors by learning a relation function based on the semantic vectors obtained by the semantic space learning;
    converting, by the processor, the relation into graph knowledge, wherein the graph knowledge uses the relation as an edge and the semantic vector corresponding to the relation as a node;
    generating, by the processor, semantic space knowledge metadata that maps the learning data, the transformation function, and the semantic vector in the semantic space learning; and
    generating, by the processor, graph knowledge metadata that maps the semantic vector, the relation function, and the graph knowledge in the relational knowledge learning,
    wherein the knowledge base system includes a learning data layer that stores and manages the learning data, a semantic space layer that stores and manages semantic space knowledge that are semantic vectors acquired according to the semantic space learning, and a graph knowledge layer that stores and manages the graph knowledge acquired by the relational knowledge learning, and
    wherein based on metadata related to the learning data, the semantic space knowledge metadata, and the graph knowledge metadata, search and association between the learning data layer, the semantic space layer, and the graph knowledge layer are made.

2. The processing method of claim 1, wherein the learning data is multimodal data including at least one of an image, a video, and audio.

3. The processing method of claim 1, further comprising:
    performing, by the processor, inference for each layer of the knowledge base system according to an inference request,
    wherein the performing of inference comprises at least one of:
    performing, by the processor, a first inference based on graph knowledge included in the graph knowledge layer;
    performing, by the processor, second inference based on semantic space knowledge included in the semantic space layer; and
    performing, by the processor, third inference based on learning data included in the learning data layer.

4. The processing method of claim 3, further comprising assigning, by the processor, different confidence to the first inference, the second inference, and the third inference, and acquiring a final inference result based on a result of the first inference, a result of the second inference, and a result of the third inference according to the different confidence.

5. The processing method of claim 3, wherein the performing of inference comprises performing inference in parallel for each of a plurality of domains.

6. The processing method of claim 3, wherein the performing of inference performs at least one of the performing of first inference, the performing of second inference, and the performing of third inference according to a predetermined inference depth.

7. The processing method of claim 3, wherein the performing of inference performs at least one of the performing of first inference, the performing of second inference, and the performing of third inference according to a predetermined time.

8. The processing method of claim 3, wherein the performing of inference comprises:
    generating, by the processor, new knowledge through multi-level knowledge inference based on input learning data or input fact information.

9. The processing method of claim 8, wherein the generating of new knowledge comprises:
    finding, by the processor, similar learning data in the learning data layer for input learning data and extracting a semantic vector corresponding to the similar learning data and a transformation function thereof in the semantic space layer;
    inferring, by the processor, a new relation by performing predictive inference based on the relation function for the extracted semantic vector; and
    generating, by the processor, graph knowledge for the inferred new relation and storing it in the graph knowledge layer.

10. The processing method of claim 8, wherein the generating of new knowledge comprises:
    verifying, by the processor, a previous prediction inference result based on input fact information;
    modifying, by the processor, a relation function corresponding to the previous prediction inference result based on the verification result;
    inferring, by the processor, a new relation by performing predictive inference based on the modified relation function; and
    generating, by the processor, graph knowledge for the inferred new relation and storing it in the graph knowledge layer.

11. A multi-layered knowledge base system, comprising:
    an interface device configured to receive data;
    a memory configured to store knowledge information; and
    a processor configured to form a knowledge base based on the data,
    wherein the processor is configured to:
        perform semantic space learning of converting learning data into a semantic vector, which is a vector of semantic space, by learning a transformation function based on a plurality of learning data input through the interface device; and
        perform relational knowledge learning of acquiring a relation between the semantic vectors by learning a relation function based on the semantic vectors obtained by the semantic space learning;
    wherein the memory is configured to:
        store a learning data layer that stores and manages the learning data;

store a semantic space layer that stores and manages semantic space knowledge that are semantic vectors acquired according to the semantic space learning; and store a graph knowledge layer that stores and manages graph knowledge acquired by the relational knowledge learning, wherein the processor is further configured to:

generate learning data metadata related to the learning data, generate semantic space knowledge metadata that maps the learning data, the transformation function, and the semantic vectors in the semantic space learning, and generate graph knowledge metadata that maps the semantic vector, the relation function, and the graph knowledge in the relational knowledge learning, wherein the relational knowledge learning unit is further configured to convert the relation into graph knowledge, wherein the graph knowledge uses the relation as an edge and the semantic vector corresponding to the relation as a node, and wherein based on metadata related to the learning data, the semantic space knowledge metadata, and the graph knowledge metadata, search and association between the learning data layer, the semantic space layer, and the graph knowledge layer are made.

12. The multi-layered knowledge base system of claim 11, wherein the processor is further configured to:

perform inference for each layer of the knowledge base system according to an inference request, and the processor is further configured to perform at least one operation of:

performing a first inference based on graph knowledge included in the graph knowledge layer;

performing second inference based on semantic space knowledge included in the semantic space layer; and performing third inference based on learning data included in the learning data layer.

13. The multi-layered knowledge base system of claim 12, wherein the processor is configured to further perform an operation of assigning different confidence to the first inference, the second inference, and the third inference, and acquiring a final inference result based on a result of the first inference, a result of the second inference, and a result of the third inference according to the different confidence.

14. The multi-layered knowledge base system of claim 12, wherein the processor is configured to:

perform inference for each of a plurality of domains, and wherein the processor performs inference in parallel for each of a plurality of domains.

15. The multi-layered knowledge base system of claim 12, wherein the processor is configured to perform at least one operation of the performing of first inference, the performing of second inference, and the performing of third inference according to a predetermined inference depth.

16. The multi-layered knowledge base system of claim 12, wherein the processor is configured to perform at least one operation of the performing of first inference, the performing of second inference, and the performing of third inference according to a predetermined time.

17. The multi-layered knowledge base system of claim 12, wherein the processor is configured to;

perform inferences about a plurality of relation functions according to the first inference and give weight results of the interferences to infer new knowledge, perform inferences about a plurality of relation functions according to the second inference and give weight results of the interferences to infer new knowledge, or perform inferences about a plurality of relation functions according to the third inference and give weight results of the interferences to infer new knowledge.

* * * * *